(12) United States Patent
Bigert et al.

(10) Patent No.: US 11,765,183 B2
(45) Date of Patent: *Sep. 19, 2023

(54) AUTOMATED DELIVERY SECURITY SYSTEM

(71) Applicant: Glue AB, Stockholm (SE)

(72) Inventors: Johnny Bigert, Stockholm (SE); Konstantinos Ioannis Sotiropoulos Pesiridis, Stockholm (SE); Magnus Olof Lorentz Hult, Stockholm (SE); Richard John Batters, Stockholm (SE); Stavros Kafouros, Stockholm (SE); Timothy Charles Blackwell, Stockholm (SE)

(73) Assignee: Glue AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/935,431

(22) Filed: Sep. 26, 2022

(65) Prior Publication Data

US 2023/0020525 A1 Jan. 19, 2023

Related U.S. Application Data

(63) Continuation of application No. 17/218,817, filed on Mar. 31, 2021, which is a continuation of application
(Continued)

(30) Foreign Application Priority Data

Mar. 23, 2017 (GB) ..................................... 1704629

(51) Int. Cl.
*G07C 9/00* (2020.01)
*H04L 9/40* (2022.01)
(Continued)

(52) U.S. Cl.
CPC ........ *H04L 63/107* (2013.01); *G07C 9/00309* (2013.01); *G07C 9/28* (2020.01);
(Continued)

(58) Field of Classification Search
CPC .................. G07C 9/00309; G07C 9/28; G07C 2009/00325
See application file for complete search history.

(56) References Cited

U.S. PATENT DOCUMENTS 9,858,739 B1 * 1/2018 Johnson .............. H04L 12/2816
10,474,980 B1 11/2019 McCalib, Jr. et al.
(Continued)

FOREIGN PATENT DOCUMENTS

GB 2417858 A 3/2006
GB 2443633 A 5/2008
(Continued)

OTHER PUBLICATIONS

Jul. 5, 2018, International Search Report and Written Opinion, PCT/EP2018/000107.
Jul. 28, 2017, Search Report, GB 1704629.3.

*Primary Examiner* — Nabil H Syed
(74) *Attorney, Agent, or Firm* — Banner & Witcoff, Ltd.

(57) ABSTRACT

A method and system for providing access to a location secured by an electronically activated locking mechanism, the method comprising: detecting a geographical position of a mobile device. Determining that the detected geographical position of the mobile device is proximate to the location secured by the electronically activated locking mechanism. Transmitting a signal causing the electronically activated locking mechanism to unlock.

20 Claims, 25 Drawing Sheets

Related U.S. Application Data

No. 16/496,055, filed as application No. PCT/EP2018/000107 on Mar. 22, 2018, now Pat. No. 11,005,854.

(51) Int. Cl.
| | |
|---|---|
| *G07C 9/28* | (2020.01) |
| *H04W 4/02* | (2018.01) |
| *H04W 12/04* | (2021.01) |
| *H04W 12/037* | (2021.01) |
| *H04W 12/082* | (2021.01) |
| *H04W 12/084* | (2021.01) |

(52) U.S. Cl.
CPC ......... *H04W 4/023* (2013.01); *H04W 12/037* (2021.01); *H04W 12/04* (2013.01); *H04W 12/082* (2021.01); *H04W 12/084* (2021.01); *G07C 2009/00325* (2013.01)

(56) References Cited

U.S. PATENT DOCUMENTS

| | | | | |
|---|---|---|---|---|
| 2007/0257774 A1* | 11/2007 | Stumpert | ............... | G06Q 10/08 340/7.1 |
| 2012/0280783 A1* | 11/2012 | Gerhardt | ................. | H04L 63/08 340/5.6 |
| 2013/0176107 A1 | 7/2013 | Dumas et al. | | |
| 2013/0282392 A1* | 10/2013 | Wurm | ................... | G06Q 10/087 705/2 |
| 2014/0351163 A1 | 11/2014 | Tussy | | |
| 2014/0351164 A1 | 11/2014 | Ballenger et al. | | |
| 2016/0098871 A1 | 4/2016 | Oz et al. | | |
| 2016/0099927 A1 | 4/2016 | Oz et al. | | |
| 2016/0116510 A1 | 4/2016 | Kalous et al. | | |
| 2016/0189459 A1 | 6/2016 | Johnson et al. | | |
| 2017/0018130 A1 | 1/2017 | Robinson | | |
| 2018/0040183 A1 | 2/2018 | Cheng et al. | | |
| 2018/0059659 A1 | 3/2018 | Takeuchi et al. | | |
| 2018/0165631 A1* | 6/2018 | Romero | ........... | G08B 13/19697 |
| 2018/0240067 A1 | 8/2018 | Oz et al. | | |

FOREIGN PATENT DOCUMENTS

| | | |
|---|---|---|
| WO | 2009128854 A1 | 10/2009 |
| WO | 2011006708 A1 | 1/2011 |
| WO | 2016027178 A1 | 2/2016 |
| WO | 2016054200 A1 | 4/2016 |

* cited by examiner

AUTOMATED DELIVERY SECURITY SYSTEM

CROSS REFERENCE TO RELATED CASES

This application claims priority to U.S. application Ser. No. 17/218,817, filed on Mar. 31, 2021, which claims priority to U.S. application Ser. No. 16/496,055, filed Sep. 20, 2019 (now U.S. Pat. No. 11,005,854), which itself claims priority to PCT/EP2018/000107, filed Jan. 4, 2018, which claims priority to United Kingdom (GB) Application No. 1704629.3, filed Mar. 23, 2017, each of which is herein incorporated by reference in its entirety for all purposes.

FIELD OF THE INVENTION

The present invention relates to a system and method for providing access to a location securely and in particular, to enable access to a property by a delivery courier without compromising security.

BACKGROUND OF THE INVENTION

The ability to order products and services electronically and have them delivered has created a huge online industry, especially for groceries and retail goods. However, such products may be delivered at unknown times or may be delayed. Many people are out of their homes when products are delivered and need to have them redelivered when they are home or are restricted to online sites that can provide a short time window for deliveries. However, as online deliveries become more popular then many delivery slots, especially in the evenings and at weekends, become unavailable.

Waiting in for deliveries is therefore less than ideal. Some existing solutions involve providing lockers accessed by codes either at residential locations or in central facilities, so that items can be picked up at a convenient time. However, such solutions are not always appropriate, especially for food or other perishable items.

Leaving a property unlocked for a delivery courier is not an option as this represents a significant security risk.

Therefore, there is required a method and system that overcomes these problems.

SUMMARY OF THE INVENTION

The system works with a securing mechanism that can unlock (and optionally lock) based on an instruction or electronic signal (e.g. wired or wireless). Such a system allows access to a property to be gained, e.g. through a door, garage, shutter and/or gate. Preferably, the signals providing access are encrypted or otherwise secured.

A user (e.g. a delivery courier) may arrive at a property and require access. This may be to make a delivery, provide a service, or for another purpose (e.g. a guest). The property will typically be secured (e.g. by mechanical or electronic lock) to prevent access, usually while a property is empty. The person requiring access and entry will have a mobile device (e.g. cell phone) that will have the capability to determine its location. This may be by using Bluetooth Low Energy scanning to ascertain the proximity of the mobile device to the property or other protected location. A GPS receiver or telecommunications network triangulation may also be used, for example. The property's location will also be known to the system, usually as part of a delivery schedule or ordering system (e.g. supermarket deliveries). When the mobile device is at, near or within a predetermined distance of the location of the property (or more specifically, the locking mechanism) then this may be detected (either at the mobile device or at a remote monitoring server that receives regular or ad hoc updates regarding the location of the mobile device). When this condition is met then a signal or command is received by the securing mechanism or lock. In other words, access is only provided to the property when the mobile is at, near or within a predetermined distance from the location (e.g. a front door).

The signal or command that causes the access to the location to be granted may originate from the mobile device, which may pass directly to the securing mechanism (e.g. using a local transmission system such as Bluetooth, WiFi, RFID, etc.) Alternatively, the signal may originate from the mobile device but may pass through a wide area network through a server (e.g. over the internet or mobile network). In another example implementation, the mobile device may be able send the command directly to the securing mechanism but may require a code or key (or other cipher) in order to do so. The unlocking procedure may also be triggered by the user initiating a command on the mobile device. For instance, this may be by swiping or pressing a button on the mobile device to unlock. The mobile device may only receive or be sent this code or key when it is at or close to the location of the property or the code or key may be received in advance by only used when in proximity to the door, lock, or property.

Unlocking doors for consumers (e.g. the occupier or resident of a property) may also be set to occur based on geographic proximity (i.e. when their own mobile device is at or close to the protected location). This feature may be known as auto unlocking.

Other events may be triggered by the mobile device arriving at the location. In some examples, a camera on the mobile device may start to capture video or still images following this event. The video or still images may be stored locally and/or at a remote location such as a server. The camera may also start recording images and/or video when the mobile device receives a command from its operator (e.g. a delivery courier) to unlock the entrance. Such an unlocking command may only be available (or operational) to the operator or user when they are at or near the location. Recording may also stop when the mobile device has left the location and/or when the door is locked (either by a command from the user of the mobile device or automatically).

When the system detects that the mobile device is no longer at or near the location of the property (or no longer receives a signal from the mobile device) then a command or signal may be sent to the securing mechanism to lock or otherwise prevent further access to the property. This may also take place after a set period. Another party (e.g. owner or resident of the property) may be provided with updates or notifications. For instance, a notification may be sent informing them that the mobile device (i.e. courier) has arrived, the property unlocked, the mobile device leaving and/or the property being unlocked. Therefore, access may be provided without compromising security.

Alternatively, locking may be explicit and achieved by the user of the mobile device sending an instruction to lock (or triggered by another command or messages such as the delivery is complete) using the mobile device. This may be a lock button or slider within an application of the mobile device, for example.

Against this background and in accordance with a first aspect there is provided a method for providing access to a location secured by an electronically activated locking mechanism, the method comprising the steps of:

detecting a geographical position of a mobile device;
determining that the detected geographical position of the mobile device is proximate to the location secured by the electronically activated locking mechanism; and
transmitting a signal causing the electronically activated locking mechanism to unlock, disengage, open a door or otherwise allow for access to be granted to a location or property. Therefore, access to a property or other location may be provided more conveniently without adversely affecting security. The mobile device may be a mobile telephone, a smartphone, a tablet computer, a laptop computer or any other battery operated or portable device. The mobile device may have a network capability provided by a SIM or other mobile network technology.

Optionally, the geographical position of the mobile device may be determined by: GPS; base station triangulation, RFID, Bluetooth Low Energy proximity detection, or WiFi. Other techniques may be used. For example, the mobile device may also be used to provide a route to the location and so the device may be able to calculate an expected time of arrival based on that route. The geographical position may be determined at the conclusion of the route.

Preferably, the signal may be transmitted from the mobile device. The signal may be transmitted directly or indirectly from the mobile device, either using short range communication or wide area communications, for example.

Optionally, the transmitted signal may be transmitted from the mobile device by: Bluetooth, Bluetooth Low Energy, WiFi, GSM, UMTS, LTE, and cellular communications in general.

Preferably, determining that the geographical position of the mobile device is proximate to the location secured by the electronically activated locking mechanism may further comprise determining that the geographical position is within a predetermined distance from the secured location. The distance may be approximately an error in the location determination technology or be absolute (e.g. within 1 m, 3 m, 5 m, 10 m or up to 100 m). The determination may be provided by a further mechanism (e.g. a wireless communication protocol, or receiver), Optionally, transmitting the signal causing the electronically activated locking mechanism to unlock may further comprise the steps of transmitting a signal from the mobile device to a server and in response, transmitting a signal from the server to the electronically activated locking mechanism. In other words, the signal may be passed via an intermediary, such as a server. This allows other checks to take place or for notifications to be triggered and/or recorded. A further signal to lock (e.g. following the delivery) may also be sent using a similar pathway.

Optionally, the signal causing the electronically activated locking mechanism to unlock may be transmitted in response to the determination that the determined geographical position of the mobile device is proximate to the location secured by the electronically activated locking mechanism. Therefore, the signal may be sent either using user interaction or command or automatically. When automatically, the determined distance to the location may be shorter (e.g. less than 3 m or 5 m).

Optionally, the method may further comprise the step of receiving a command from a user to unlock the locking mechanism (or lock the mechanism at an appropriate time or trigger) and transmitting a signal causing the electronically activated locking mechanism to unlock when it is determined that the geographical position of the mobile device is proximate, close to, upon, or adjacent to the location secured by the electronically activated locking mechanism. Any lock signal or command may use the same or similar procedure. However, the preferred commands or signals are triggered by the user.

Optionally, the method may further comprise the step of initiating a recording from a camera of the mobile device in response to determining that the detected geographical position of the mobile device is proximate to the location secured by the electronically activated locking mechanism. This may provide the owner or resident to view the entry and exit of the property either in real-time or by a recording step. The recording may also be initiated and stopped (e.g. automatically) when a manual command to unlock and lock (or other message or command indicating arrival or completion) are sent from the mobile app, respectively.

Preferably, the recording may be stored within a remote server and/or the mobile device.

Optionally, the method may further comprise the step of sending a notification indicating that the mobile device is proximate to the location secured by the electronically activated locking mechanism. Other updates or notification may be generated and sent.

Optionally, the notification may be received by a further mobile device or other computing device. The notification may be a push notification or may be a text-based notification (e.g. SMS, email, etc.)

Optionally, the method may further comprise the step of transmitting a further signal causing the electronically activated locking mechanism to lock. This improves security further as the system and method is not reliant on a person remembering to activate the lock. Access to the location is only provided while a particular mobile device is on site or close by.

Optionally, the further signal may be transmitted after determining that the mobile device is no longer proximate to the location secured by the electronically activated locking mechanism. This may be achieved by constant or regular location of the mobile device (e.g. using GPS or triangulation) or by determining that the device is not within range of a signal (e.g. Bluetooth or WiFi).

Preferably, determining that the mobile device is no longer proximate to the location secured by the electronically activated locking mechanism may further comprise determining that the geographical position of the mobile device is greater than a further predetermined distance from the secured location. This may be the same or a different distance (greater or less) to that required to unlock the mechanism.

Optionally, the method may further comprise causing a notification to be sent indicating that the electronically activated locking mechanism has been locked.

Optionally, the signal causing the electronically activated locking mechanism to unlock enables the mobile device to issue a command to unlock the electronically activated locking mechanism. Therefore, both events may be required to further improve security.

Preferably, the signal causing the electronically activated locking mechanism to unlock is protected by encryption. The mobile device may also be secured (so that only a single device may be able to issue signals).

Optionally, before transmitting the signal causing the electronically activated locking mechanism to unlock, the method may further comprise the step of issuing a request for access to the electronically activated locking mechanism. This allows the system to interface with different locks or other access devices that may be monitored and controlled using third party systems. The request may be issued at any time before the unlock command is issued but preferably in advance of all of the other method steps.

Preferably, the access may be granted for a limited period of time. This may be a short period (e.g. 30 mins to one or more hours) or for more extended periods (one or more weeks to months).

Advantageously, the request and any response may be issued using an application programming interface, API. This makes it easier to interface between different systems.

According to a second aspect there is provided a system for providing access to a location comprising:
  an electronically activated locking mechanism;
  memory storing computer-executable instructions that, when executed by the processor, cause a computer to:
  receive a signal indicating that a mobile device is proximate to a location secured by the electronically activated locking mechanism and in response, transmitting a signal causing the electronically activated locking mechanism to unlock. The signal causing the electronically activated locking mechanism to unlock may be sent automatically (upon detection of proximity to the location) or only allowed to be sent (i.e. following a manual instruction to do so, perhaps from the mobile device) if the mobile device is proximate to the location (i.e. a proximity check is made). This may involve receiving a manual command to unlock (or other message) but refusing to do so until the mobile device is closer to the location (e.g. sending or displaying on the mobile device an error or refusal message) or not providing the user interface with any way to issue the open command until the mobile device is proximate to the location, e.g. by greying out or hiding the UI item (for example, button or slider) that initiates the request.

Preferably the system may further comprise one or more servers containing the memory storing the computer-executable instructions.

According to a third aspect there is provided a non-transitory storage medium storing machine-executable instructions that, when executed, cause a computing device to provide access to a location secured by an electronically activated locking mechanism by:
  detecting a geographical position of a mobile device;
  determining that the detected geographical position of the mobile device is proximate to the location secured by the electronically activated locking mechanism; and
  transmitting a signal causing the electronically activated locking mechanism to unlock. This may take the form of a mobile app and/or server software interacting with the mobile app. A plurality of mobile devices may be used so that multiple locations may be unlocked and/or locked simultaneously. Different functions may be stored within different storage media. For example, some functions may be stored within a mobile app and other stored on a server.

The methods described above may be implemented as a computer program comprising program instructions to operate a computer. The computer program may be stored on a computer-readable medium.

The computer system may include a processor such as a central processing unit (CPU). The processor may execute logic in the form of a software program. The computer system may include a memory including volatile and non-volatile storage medium. A computer-readable medium may be included to store the logic or program instructions. The different parts of the system may be connected using a network (e.g. wireless networks and wired networks). The computer system may include one or more interfaces. The computer system may contain a suitable operating system such as UNIX, Windows® or Linux, for example.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which.

It should be noted that the figures are illustrated for simplicity and are not necessarily drawn to scale. Like features are provided with the same reference numerals.

DETAILED DESCRIPTION OF THE PREFERRED EMBODIMENTS

Figure 1:
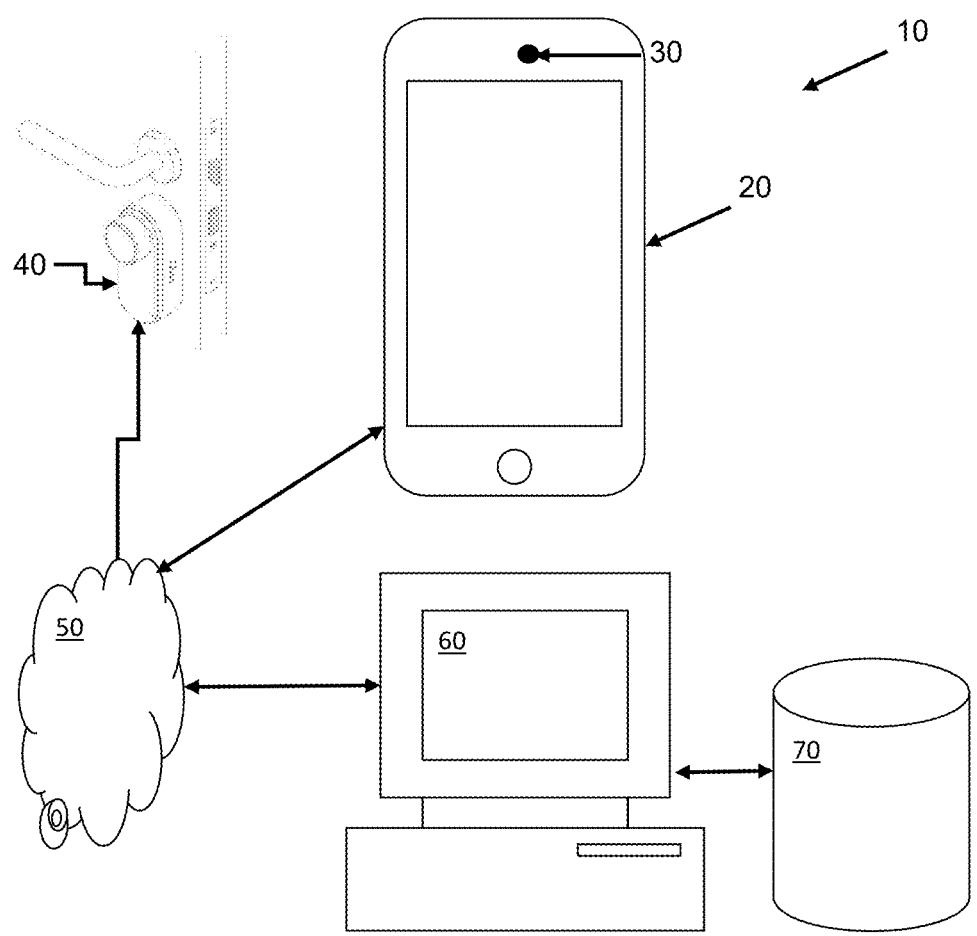
FIG. 1 shows a schematic diagram of a system for providing access to a location secured by an electronically activated locking mechanism.

FIG. 1 shows a schematic diagram of a system 10 for providing access to a location such as a home or business. The system 10 includes one or more mobile devices 20 that may be equipped with certain functionality, including at least hardware enabling the mobile device 20 to determine its geographic location. This may be a GPS or similar chipset or the mobile device 20 may be able to determine its location by triangulation methods using mobile network base stations and signals or other wireless signals. The mobile device 20 shown in this example includes a camera 30 that may be a front facing camera or a rear facing camera. The system 10 also includes one or more electronically activated locking mechanisms 40 that are linked to a network 50 such as the internet. The electronically activated locking mechanisms 40 may secure doors to premises and may operate when they receive signals causing the doors to be locked or unlocked. The mobile device 20 may also be connected wirelessly with the internet 50, either directly or through a mobile or other network. In this example, both the electronically activated locking mechanism 40 and the mobile device 20 may be in communication with one or more servers 60 over the network 50.

The server shown in FIG. 1 is also connected to a database 70, which may store location information for each of the electronically activated locking mechanisms 40 and other data, such as a security data used to secure the system 10 or order data used to generate, schedule and manage deliveries to the secured locations.

Figure 2:
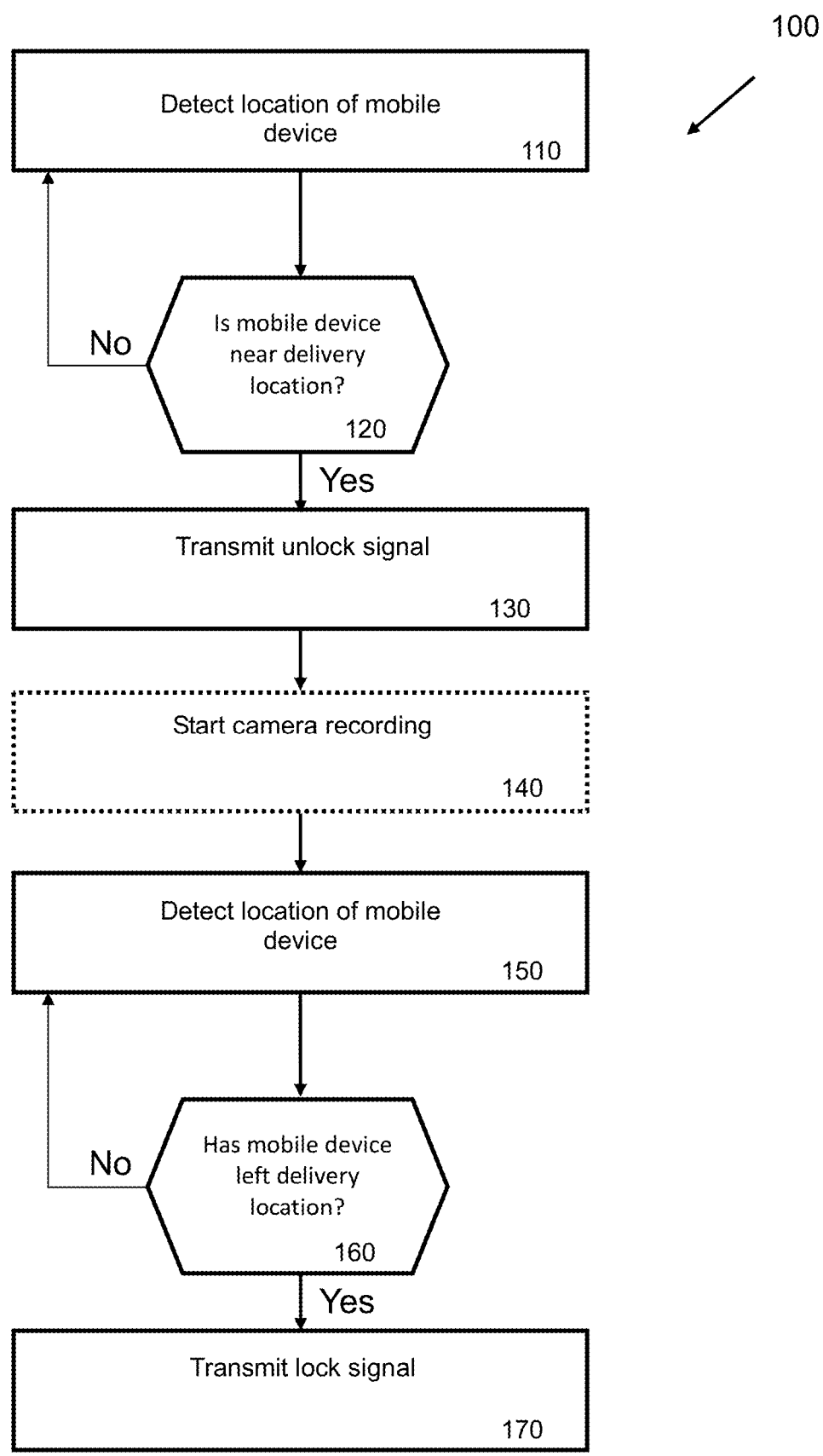
FIG. 2 shows a flowchart of a method for providing access to a location secured by the electronic locking mechanism shown in FIG. 1.

FIG. 2 shows a flowchart that illustrates a method 100 for operating on the system 10 described with respect to FIG. 1. This method 100 may be only a part of a wider method or implementation, such as a delivery system, for example Therefore, not all steps are necessarily shown.

At step 110, the location of the mobile device 20 is detected. This may take place continually or at intervals (or on a particular trigger or event). The determined geographical location of the mobile device 20 may be compared against a particular location (i.e. the location of a property or building protected by the electronically activated locking mechanism 40) or in this example, a delivery location, which may also be the location of the location or position of the electronically activated locking mechanism 40. Step 120 determines when the mobile device 20 is near or at the defined location. If the mobile device 20 is not near or at the location (delivery location), then detection continues and the method loops back to step 110. When the determination is made at step 120 that the mobile device 20 is at or near the delivery location, then the method proceeds to step 130, which causes a signal to unlock the electronically activated locking mechanism 40. Such a signal may be transmitted directly from the mobile device 20, indirectly from the mobile 20 through the server 60, or from the server 60 directly or from another server, for example. There may be several signals in a chain of signals that ends with the electronically activated locking mechanism 40.

Step 140 is an optional step, as indicated by the dotted lines, in which the camera 30 of the mobile device starts recording. In this example implementation, this recording is triggered also when the mobile device is determined to be near or at the delivery location.

The method 100 may proceed to further detections of the location of the mobile device 20 at step 150, which again loops with a determination step to identify when the mobile device has left the location, which occurs at step 160. Again, this loops back to the detection of the location of the mobile device (step 150) if it is determined that the mobile device has not left the location. However, when the determination step 160 determines that the mobile device 20 has left the location, then this causes a further signal to be sent to the electronically activated locking mechanism 40 to cause it to lock at step 170 (i.e. auto-lock logic). In other words, whilst the mobile device 120 is at or near the particular location, then the door may be unlocked but when the mobile device 20 is sufficiently far from the location, then the door may be automatically locked. Alternatively, the electronically activated locking mechanism 40 may default to a locked state in the absence of a signal indicating that the mobile device 20 is still present (e.g. after a predetermined time). This provides a failsafe locking procedure should a network connection fail, for example.

There may be an additional path within or separate from the method of FIG. 2 to transmit a lock signal without using the auto-lock logic. The signal locking the locking mechanism may be explicitly sent from the device and without prior determination of proximity.

Figure 2A:
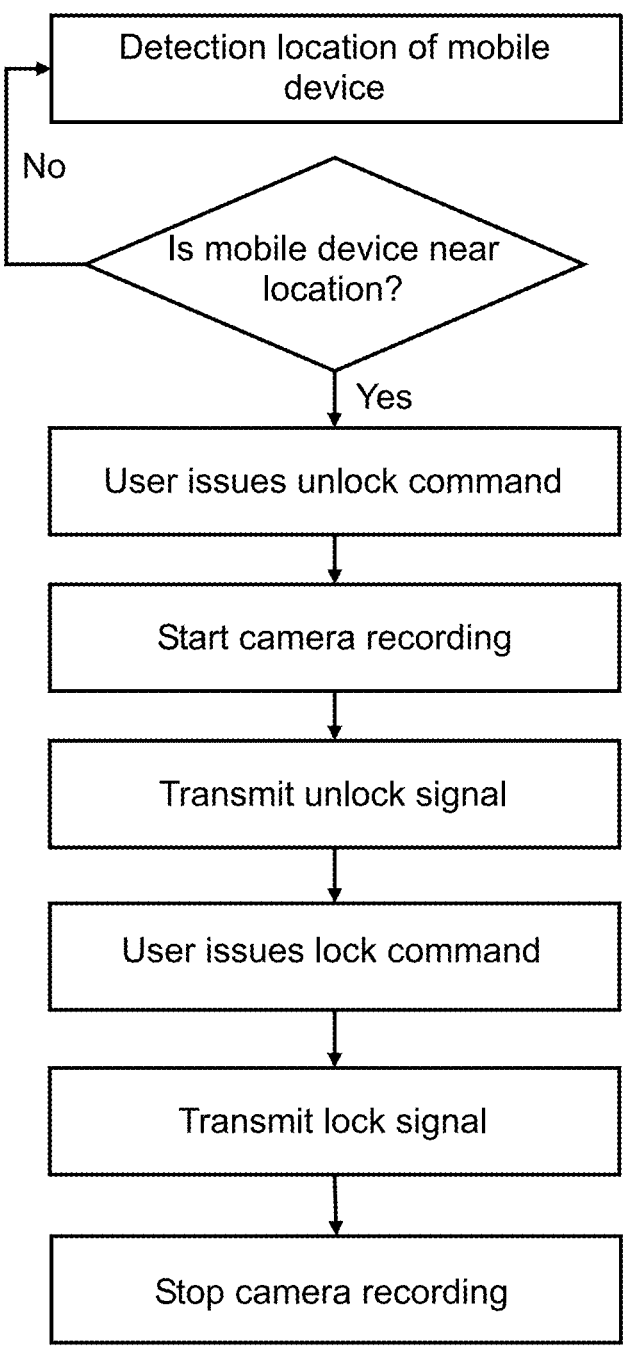
FIG. 2A shows a flowchart of a further example method for providing access to a location secured by the electronic locking mechanism shown in FIG. 1.

FIG. 2A shows a flowchart of an illustrative example method for providing access to a location or property. In this example, the location of the mobile device is detected. A determination is made as to whether the mobile device is near to the property (local mobile device). However, a user may then issue an unlock command (i.e. manually). This may be sent from another (remote) mobile device, for example. The camera of the mobile device (near to the location) starts recording followed by a signal sent to actually unlock the lock mechanism. The user can then issue a lock command from the remote mobile device (e.g. swiping on a mobile application). This initiates a transmission to the lock the mechanism and ends with the camera of the local device ceasing its recording. This procedure may be similar to the method described with reference to FIG. 2, except that a manual command is required from a remote device to unlock and/or lock the locking mechanism.

Figure 3:
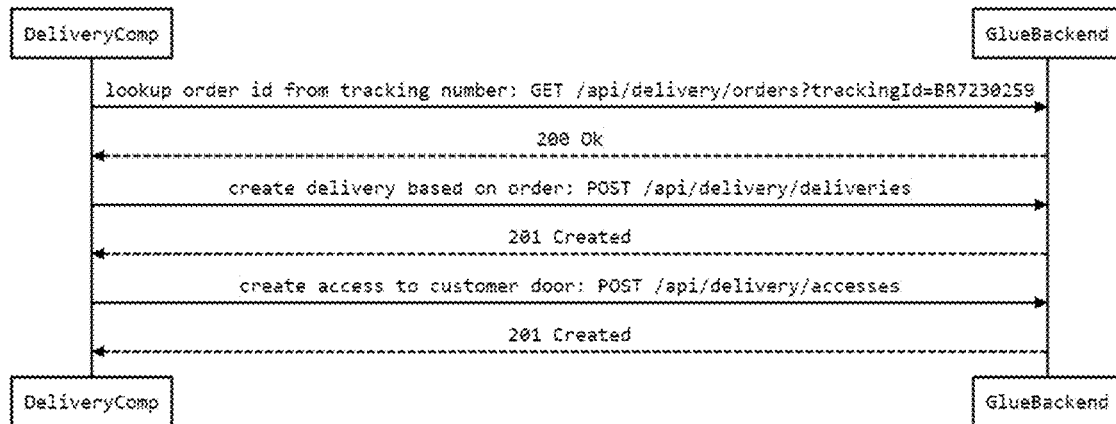
FIG. 3 shows a sequence diagram of an example implementation of a portion of the method of FIG. 2.
Figure 4:
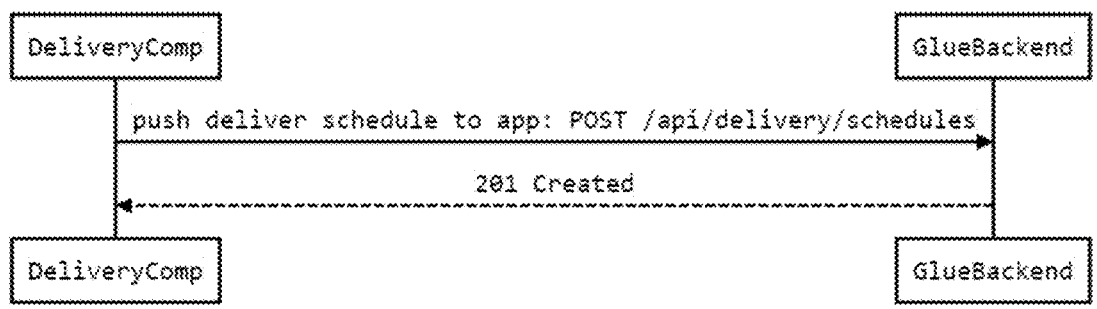
FIG. 4 shows a further sequence diagram showing a further portion of the method of FIG. 2.
Figure 5:
FIG. 5 shows a further sequence diagram of a further portion of the method of FIG. 2.

FIGS. 3 to 5 show sequence diagrams indicating the interaction between an application operating on a mobile device 20 and a backend program operating within the server 60. FIG. 3 shows the steps involved in generating a delivery of goods that may be sent to a particular location secured by the electronically activated locking mechanism 40. This may be tracked based on its order ID. A delivery may involve providing access to the particular customer's door. Whilst HTTP code is shown in the figures, different code types may be used with similar effect.

FIG. 4 shows the generation of a delivery schedule for a courier that may use the mobile application operating on the mobile device 20. This schedule may include a plurality of deliveries with different customers being served so that the mobile location causes the unlocking of each door when the mobile device 20 arrives. FIG. 5 shows further steps used to generate the delivery schedules.

FIGS. 6 to 25 show a series of screenshots taken to generate an order and direct a delivery courier to the order's destination. FIGS. 6 to 12 show example screenshots of the order generation steps (i.e. on a customer's device, which is not shown in the figures).

Figure 6:
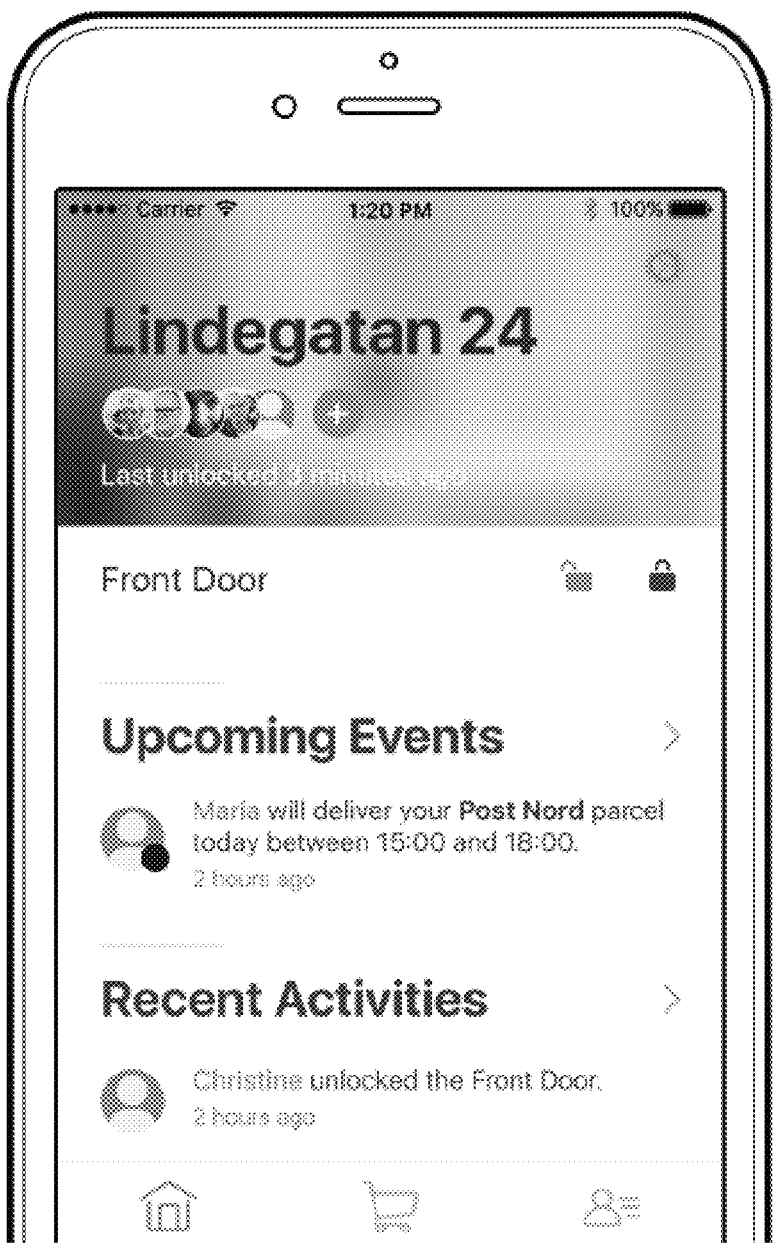
FIGS. 6 to 24 show a series of screenshots of mobile applications operating on a mobile device implementing the method of FIG. 2.

Different mobile apps may operate on the customer's mobile device (not shown in the figures) and the delivery courier's mobile device 20. FIGS. 6 to 12 show screenshots of how the customer's mobile app may generate an order. FIG. 6 shows a screen of this mobile application, which describes pending deliveries and recent activities.

Figure 7:
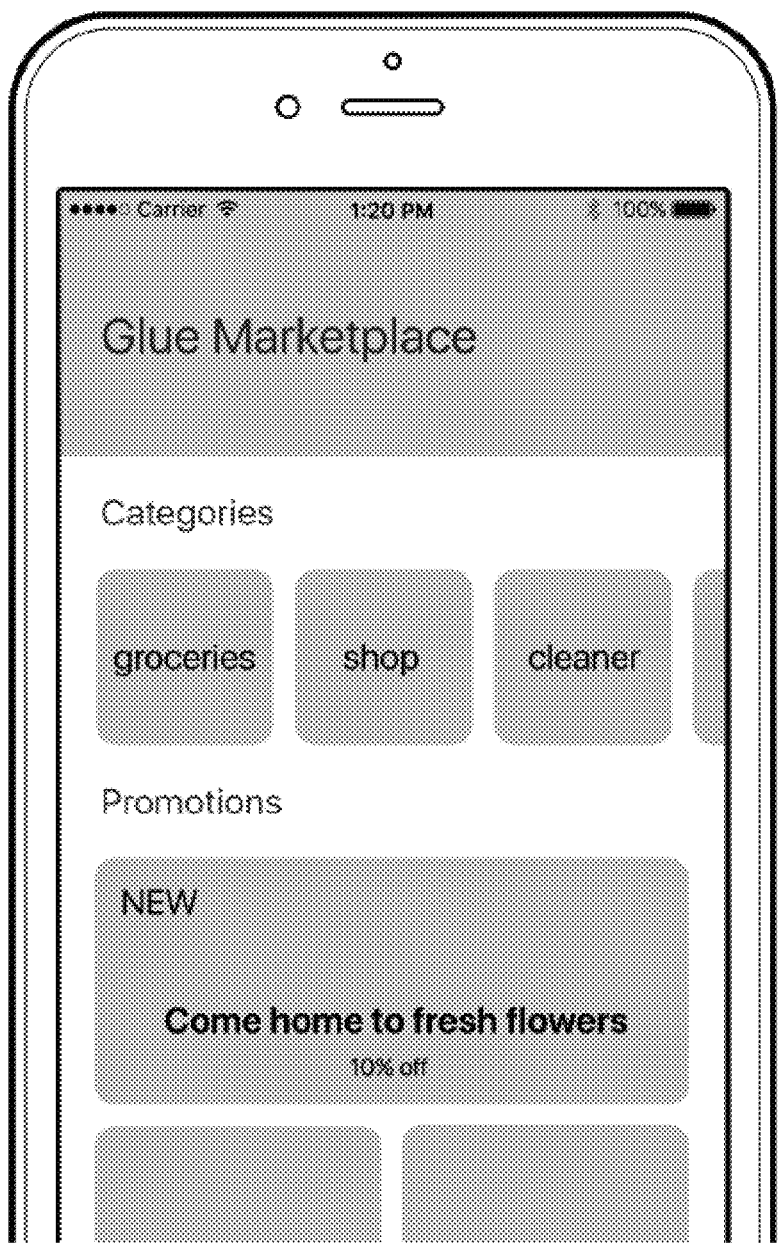
Figure 8:
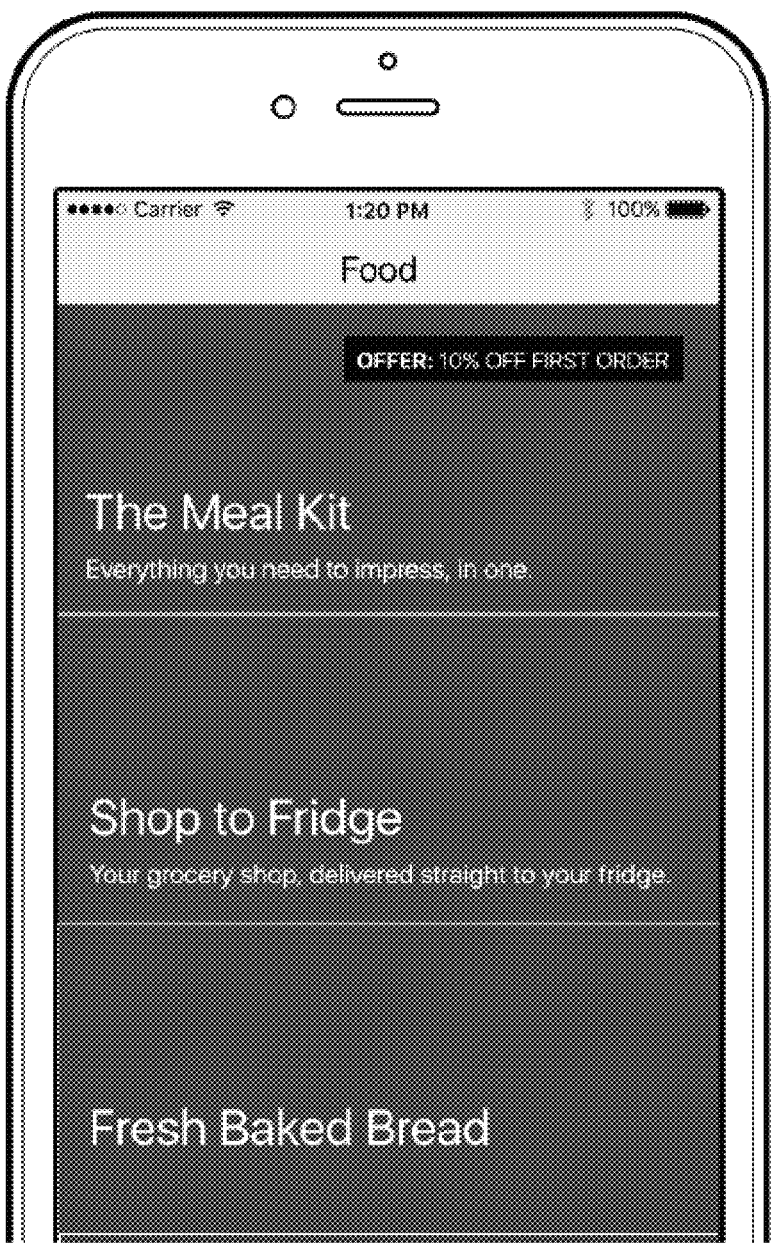
Figure 9:
Figure 10:
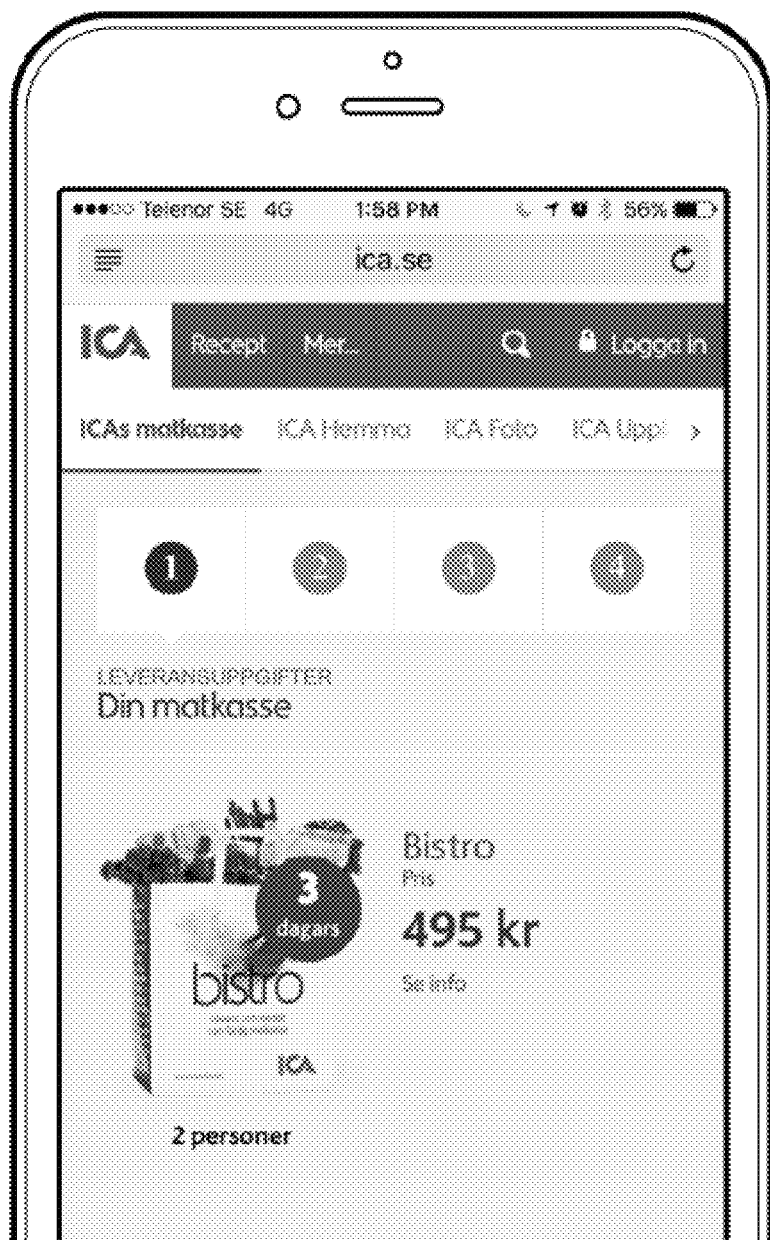
Figure 11:
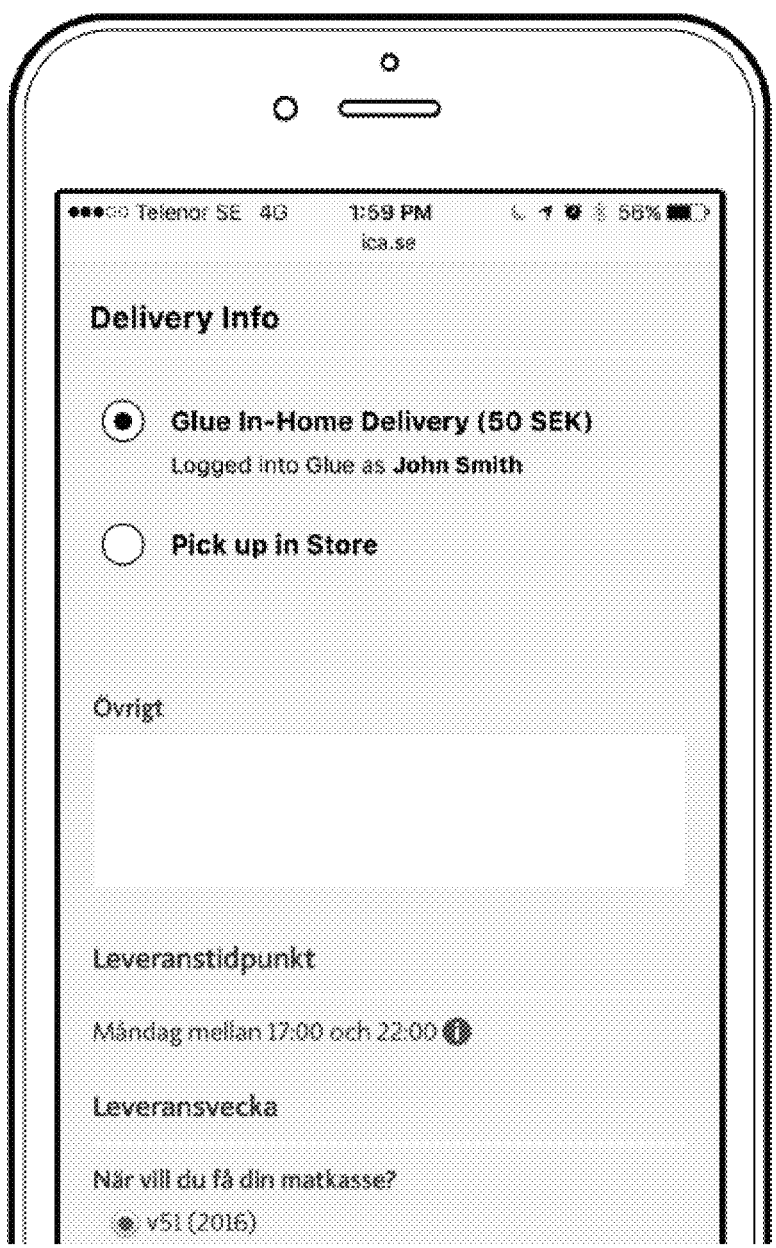
Figure 12:
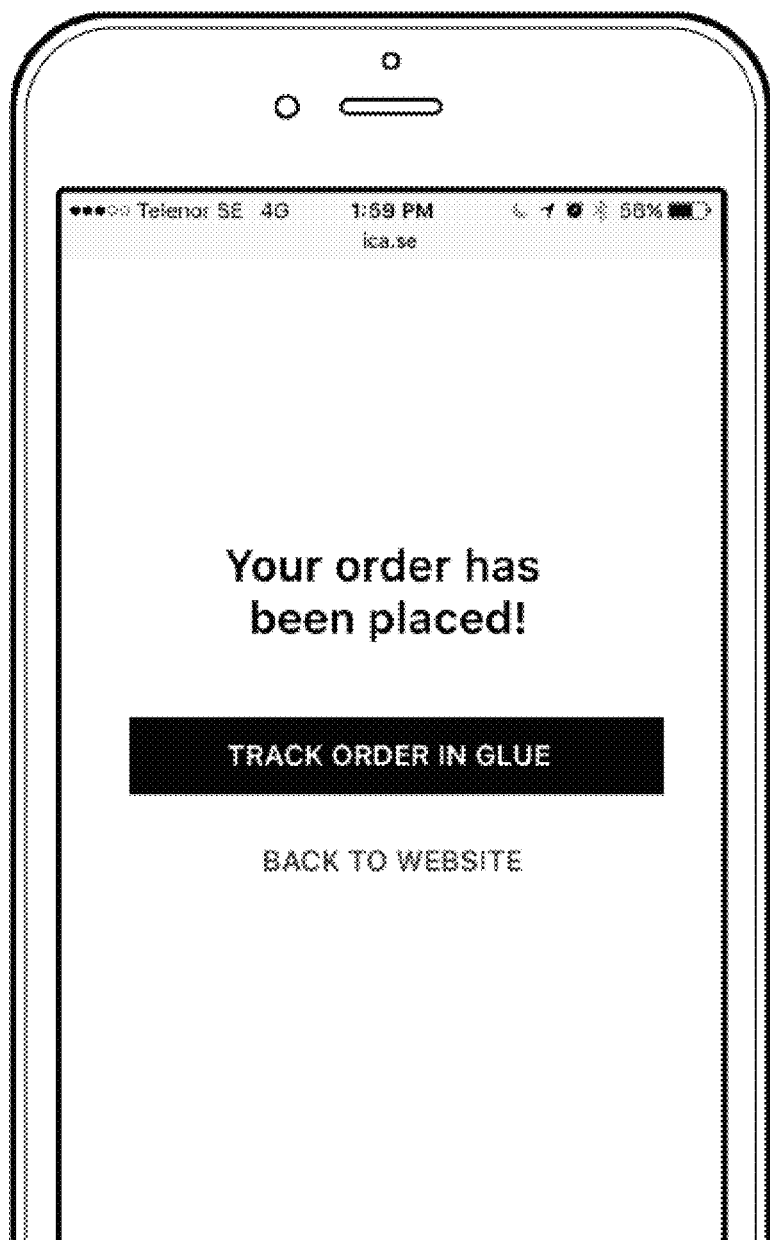

FIG. 7 shows different categories of shops providing different types of products that may be delivered. FIG. 8 shows further options that are provided when one of these categories is selected. In this example, a food delivery is being initiated. FIG. 9 shows a particular set of products that may be delivered and FIG. 10 shows the cost of this set of products. FIG. 11 shows the delivery options, including an option for a home delivery without the customer needing to be present using the system 10 described with reference to FIG. 1 and the method 100, described with reference to FIG. 2. FIG. 12 indicates that the order has been placed and that the order may now be tracked. Other order generation steps may take place and these may use other device types (i.e. a desktop computer and browser).

FIGS. 13 to 20 show mobile app screenshots at particular stages in the method 100 when the mobile device 20 is used by the delivery courier. The mobile device 20 allows both the delivery to be coordinated and the electronically activated locking mechanism 40 to be unlocked (or caused to be unlocked when the criteria for unlocking are met).

Figure 13:
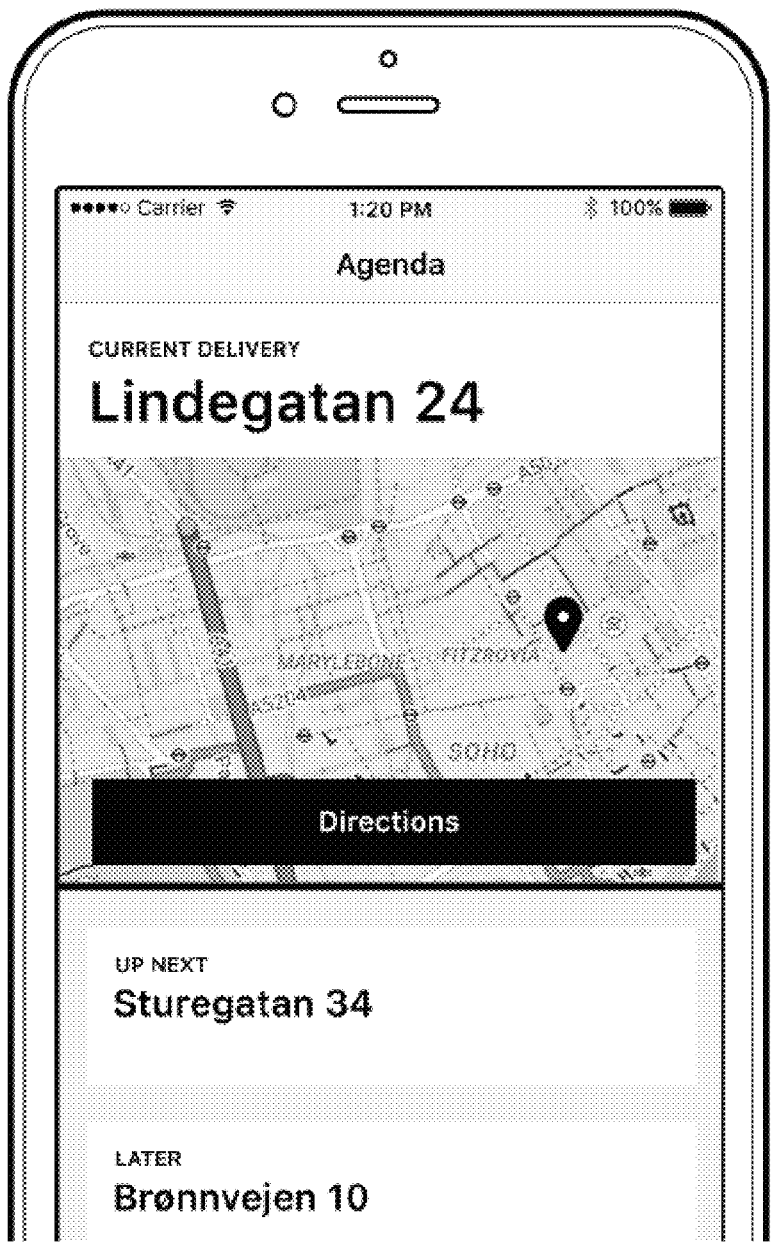
Figure 14:
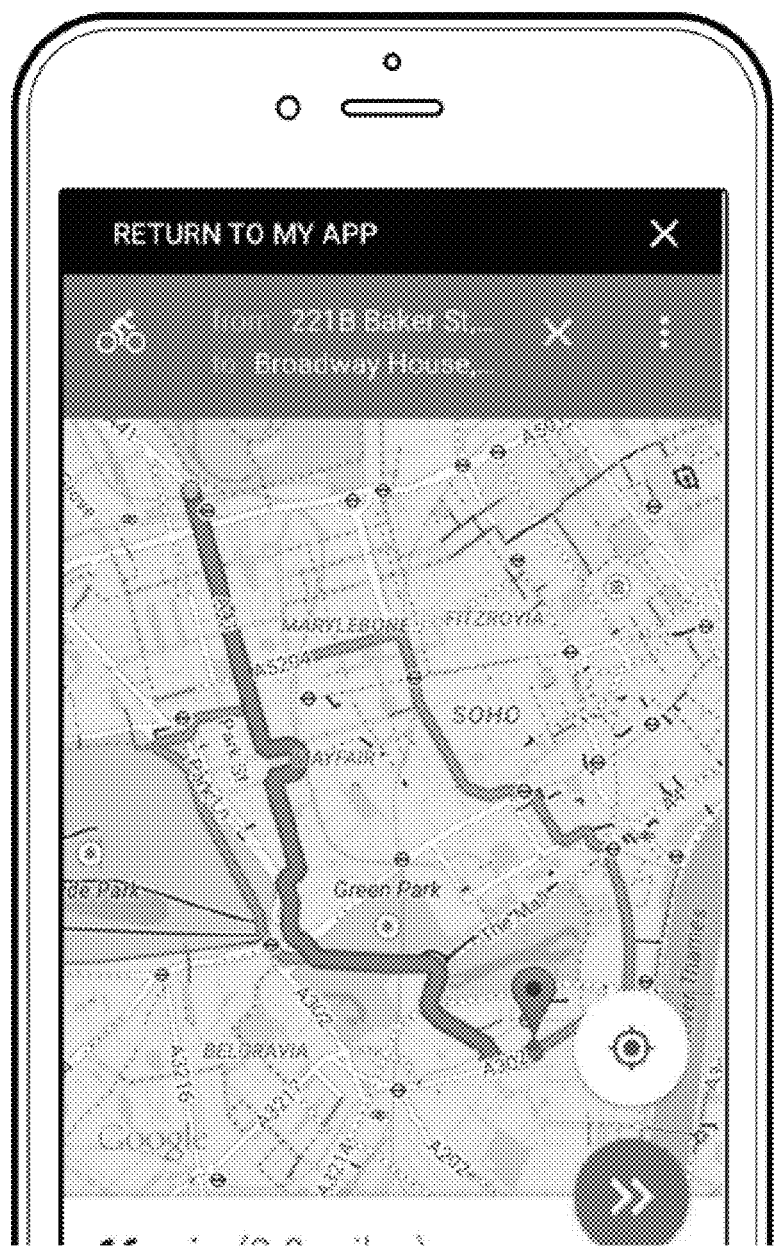
Figure 15:
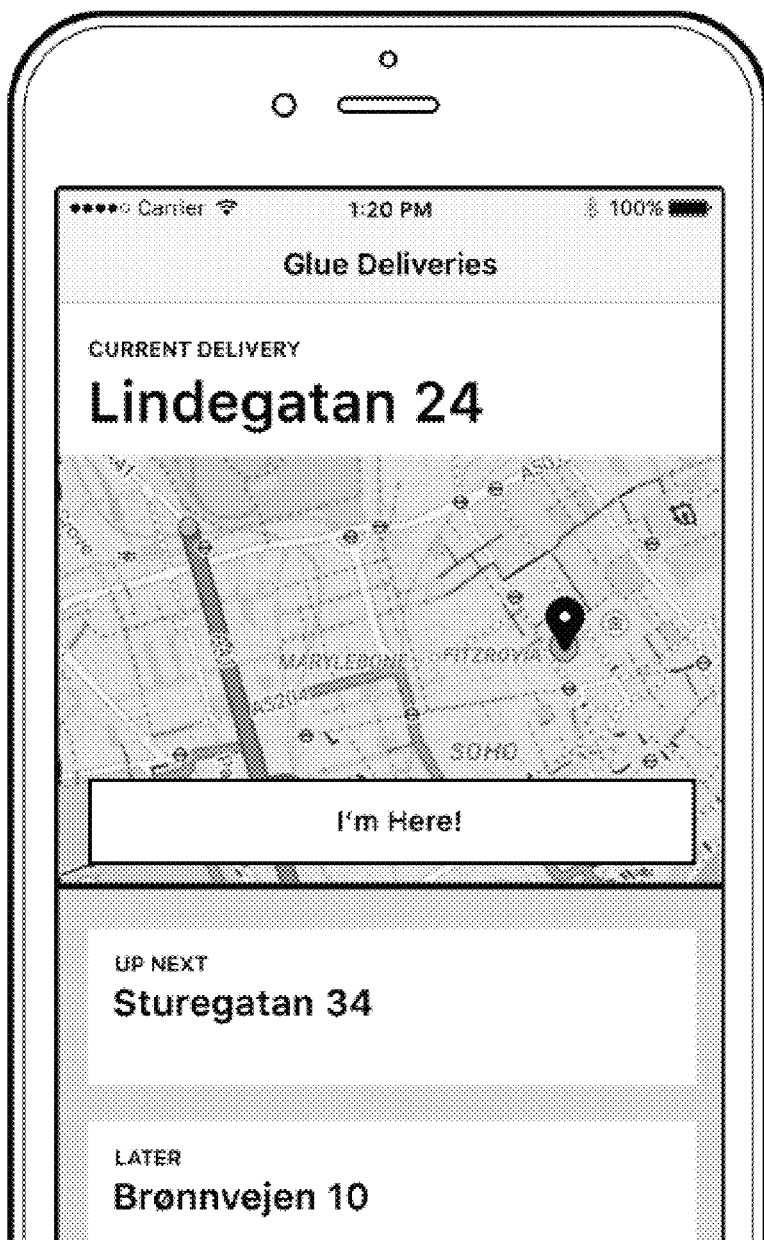

FIG. 13 shows a screen shot indicating a delivery location and provides the delivery courier with directions to the particular property. FIG. 14 shows a screenshot of the mobile device 20 during the mapping and direction procedure, which may involve the use of a conventional mapping program on the mobile device 20. FIG. 15 shows a screen shot of the mobile device 20 indicating to the delivery courier arrival at the destination.

Figure 16:
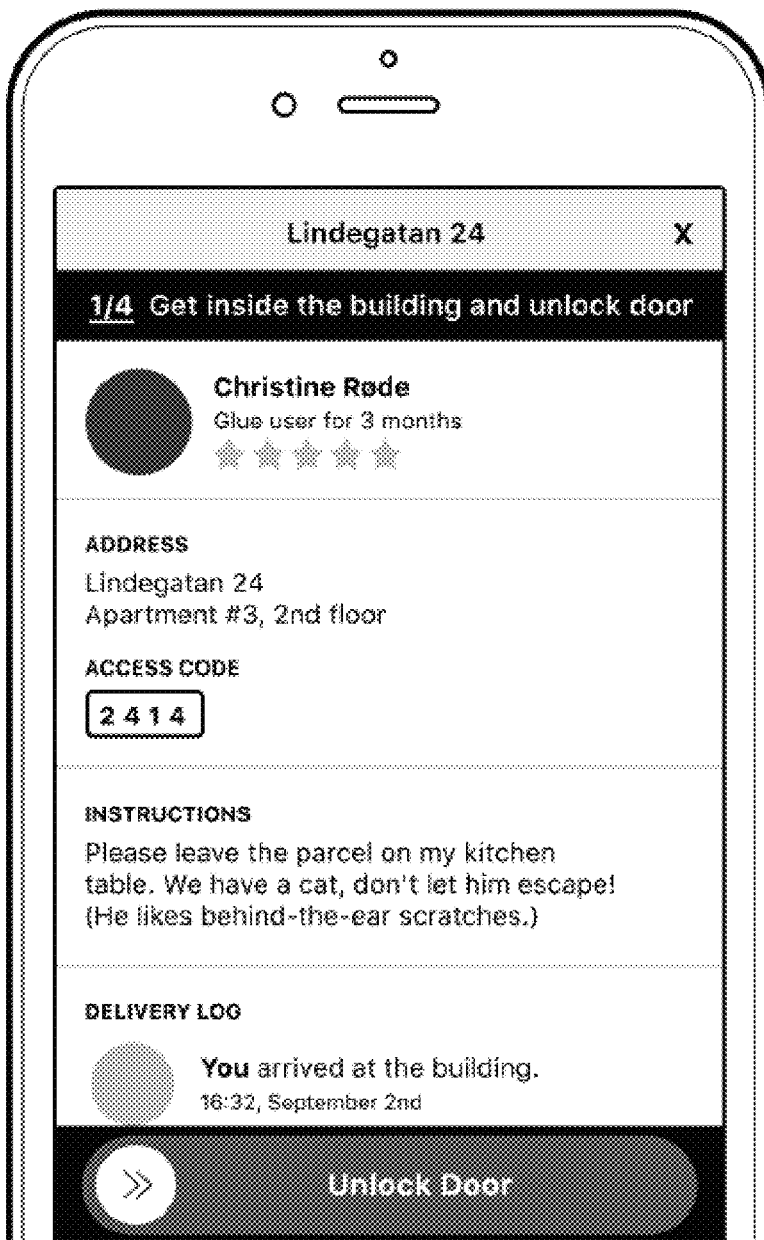
Figure 17:
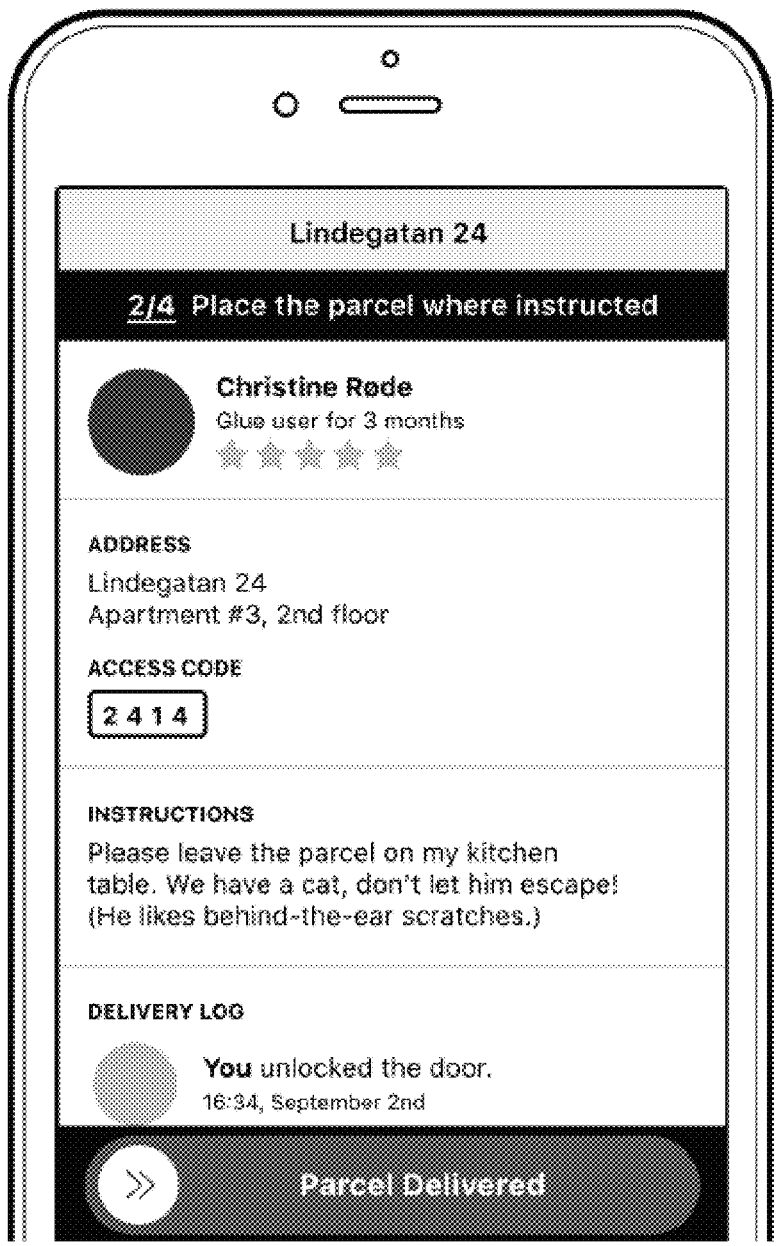

The mobile app provides instructions to the delivery courier and FIG. 16 shows a first screenshot of four-step procedure for gaining access and delivering the goods to a particular location. For example, as indicated in FIG. 16, the mobile app has determined that the mobile device 20 has arrived at the location and is within a predetermined distance from the front door. Therefore, this initiates this particular sequence of events on the mobile application leading to the door being unlocked. FIG. 16 includes a swipe button enabling the courier to issue a signal to unlock the door. FIG. 17 shows the second stage of the four-step procedure after the delivery courier has issued the command to unlock the door (i.e. causing the command to be sent to the electronically activated locking mechanism 40). This screenshot shows a further swipe icon allowing the delivery courier to indicate that the parcel has been delivered.

Figure 18:
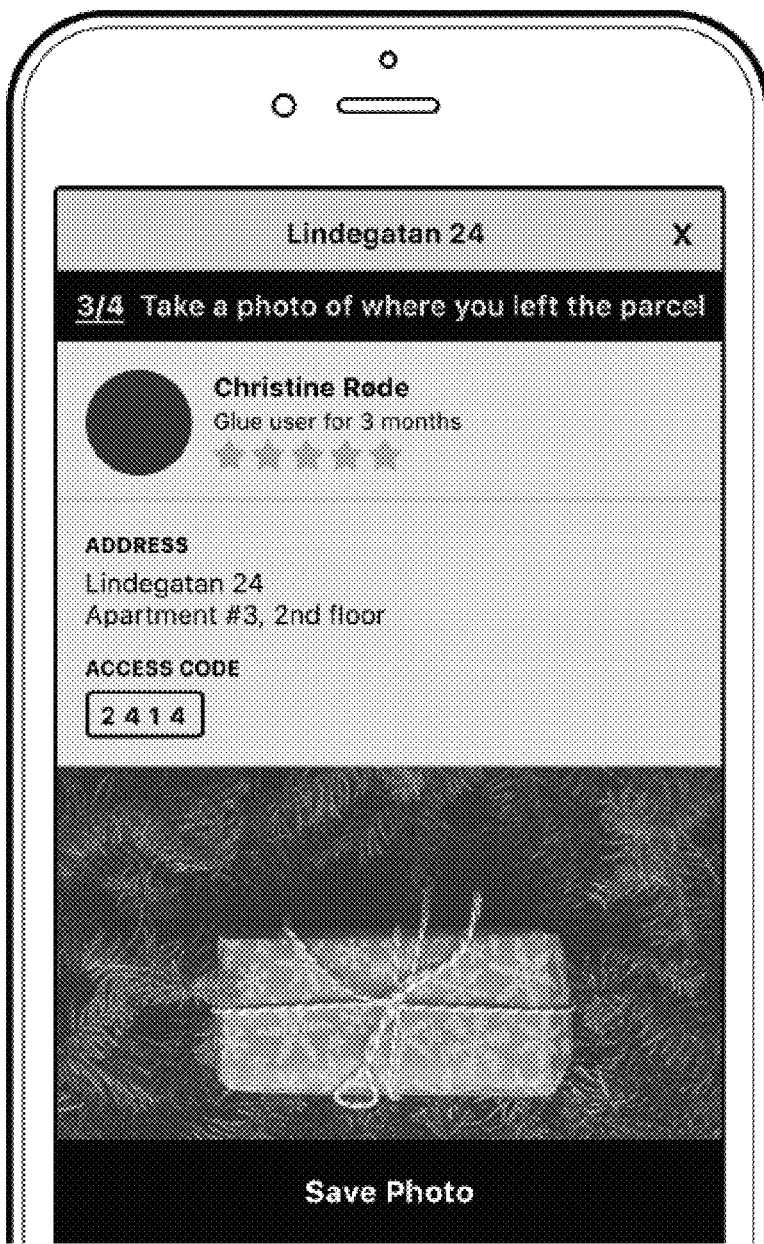
Figure 19:
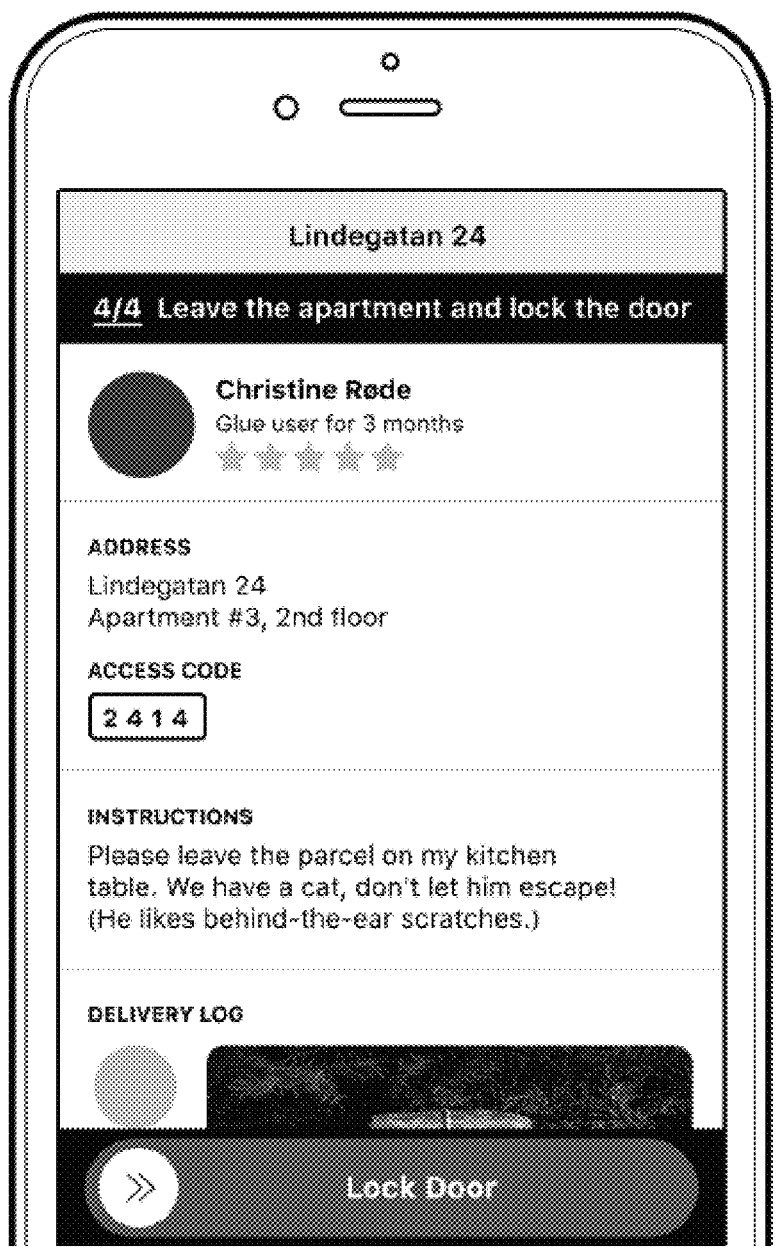

FIG. 18 shows a screenshot of the mobile device 20 with the camera 30 recording images. In this case, the third stage of the three-step procedure requires the delivery courier to obtain a photograph of the package delivered to its particular location within the property. This includes a button to save the image. Separately, video may be acquired from the same or different camera 30 on the mobile device for security purposes. The last stage or step four of this procedure is indicated in the screenshot shown in FIG. 19 that records the delivery and photograph (still image of package in this example) and provides a further swipe button allowing the delivery courier to lock the door or send a signal to the electronically activated locking mechanism 40 to engage the lock once the delivery courier has left the premises.

Figure 20:
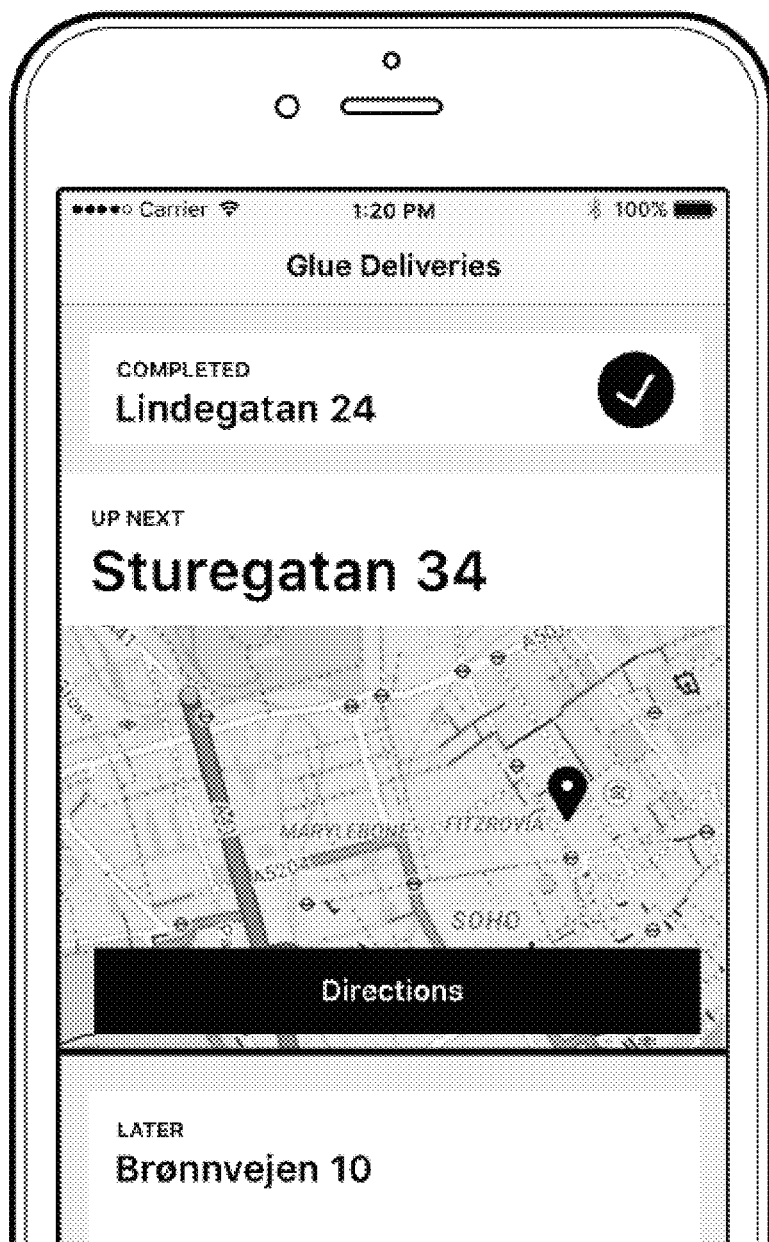

Optionally, this locking procedure may be automated and based on the location of the mobile device 20 being outside of the property, as determined by a GPS or other location mechanism. The locking procedure may also be initiated automatically should the deliver courier forget. FIG. 20 shows a further screenshot on the mobile app of the delivery courier's mobile device 20 indicating that the delivery has been completed.

Figure 21:
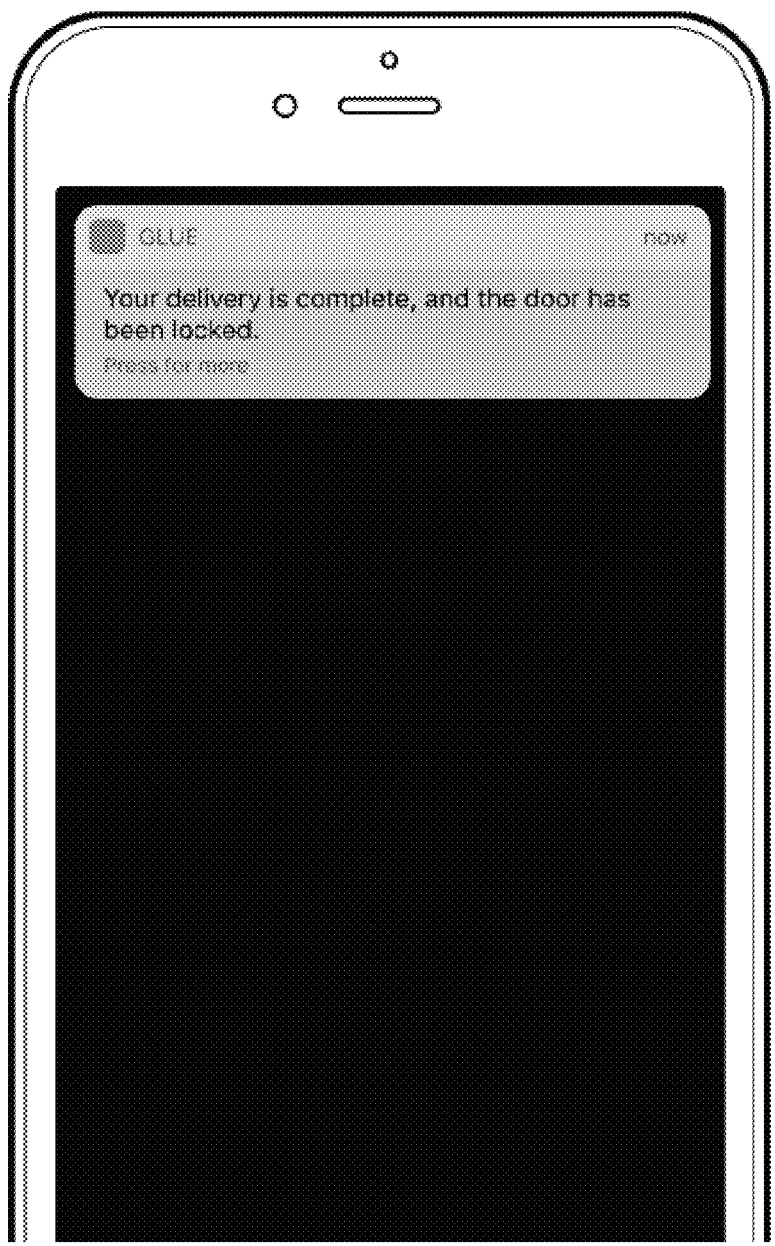
Figure 22:
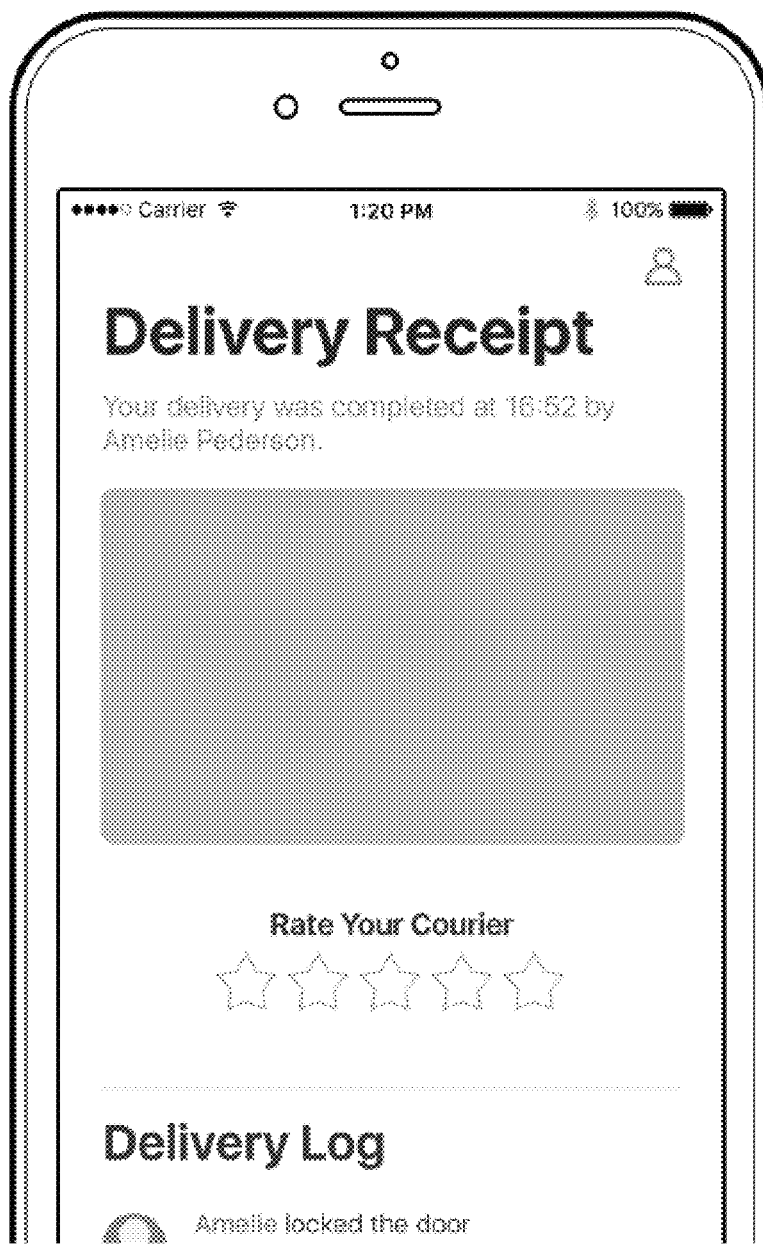
Figure 23:
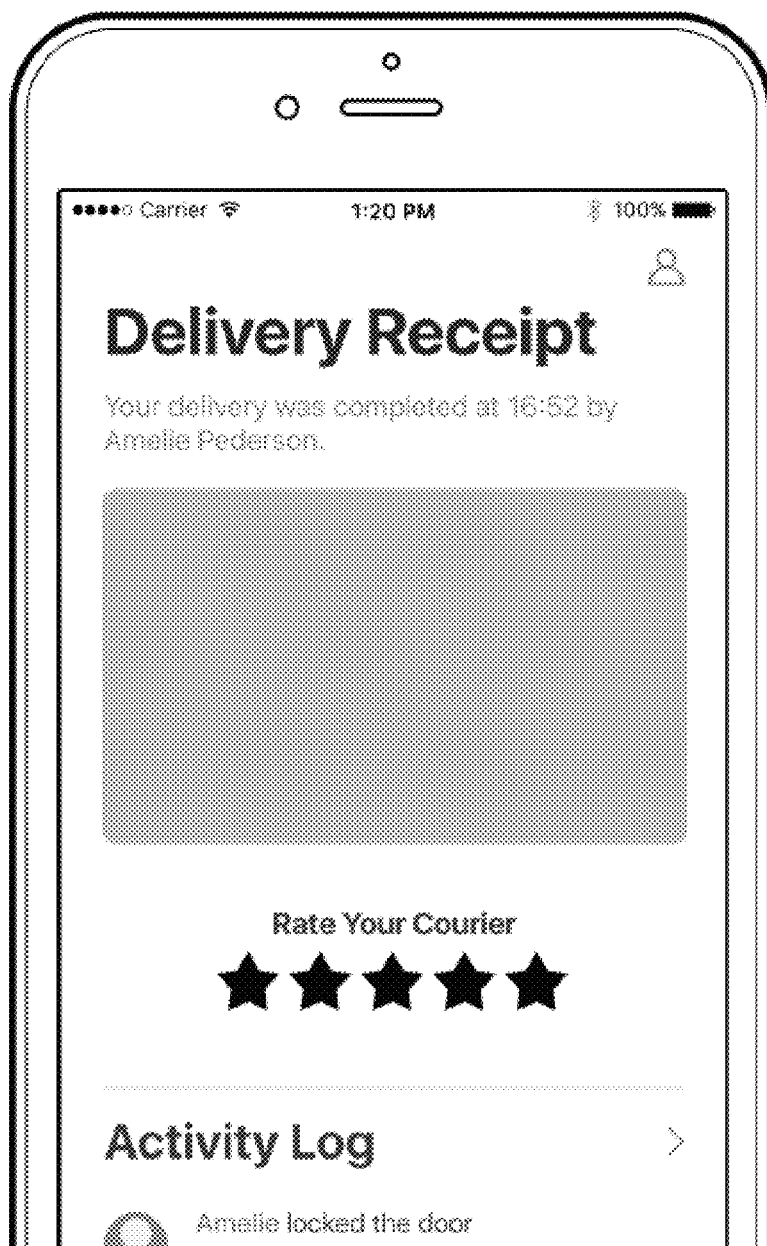
Figure 24:
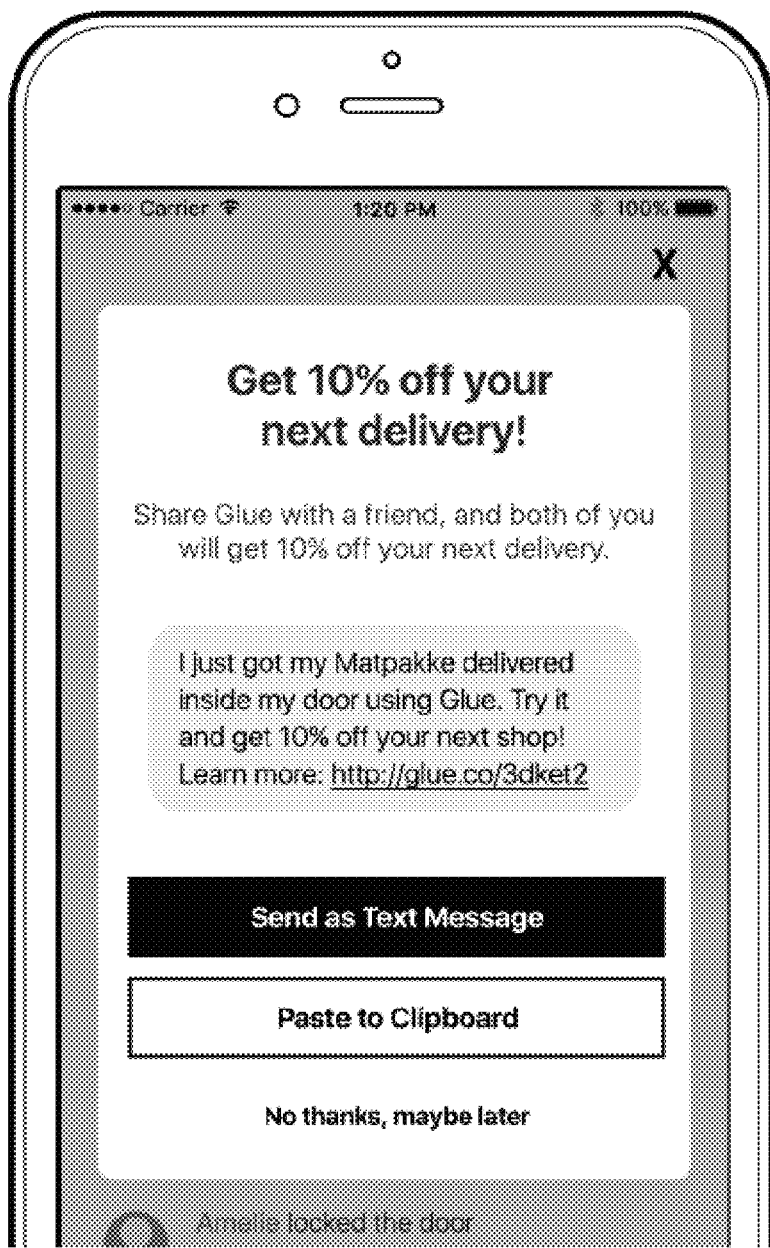

FIG. 21 shows a screenshot on the mobile device of the customer that illustrates a message being sent providing notification that the delivery has taken place. FIGS. 22 to 24 show screenshots on the customer's mobile device indicating a receipt of delivery showing when the delivery was completed and providing an opportunity to rate the delivery and providing further offers for additional services or future deliveries to the customer. Other optional screens and functionality may be provided.

The following steps provide a description of the programming steps used as a further example implementation of method 100. These may be described as a delivery and return flow:

1. User chooses delivery option (or pickup of return goods) and enters phone number N on ecommerce site S (e.g. a supermarket delivery company).
2. Site calls a REST API asking for locks (identifiers) and addresses for user with number N (poll for 30 seconds or other time).
3. User gets prompted in app: Is it ok that site S gets access to your locks and addresses?
4. User places order on site S.
5. Site S calls the REST API to create new order (POST/api/service/orders) user id and lock id I.
6. User gets prompted in consumer app: do you accept this delivery into your home? (Time not decided yet.)
7. Later, after the ecommerce player has booked delivery: Site S calls the REST API to add a delivery tracking id to the order (PATCH/api/service/orders).
8. When Delivery company D gets the package: D calls the REST API to look up the order id from the tracking id.
9. D calls the REST API to create a delivery (POST/api/delivery/deliveries) from the order id.
10. When D has scheduled the delivery: D asks for access to door with lock id I (POST/api/delivery/accesses).
11. User gets notified in consumer app: your package will be delivered into your home between time t1 and t2 (could be multiple days).
12. D calls REST API to schedule deliveries for driver and day (POST /api/delivery/schedule).
13. At the day of delivery: Delivery app downloads driver schedule (GET /api/delivery/schedule).
14. Delivery app presents list of deliveries.
15. Driver goes to location for first delivery.
16. App checks geolocation to make sure driver is in the right place.
17. Driver unlocks door: delivery app calls REST API (GET /api/accesses/{id}/unlock).
18. Home owner is notified of progress in consumer app.
19. Delivery app may turn mobile device camera on and films all actions of driver.
20. Video is uploaded to cloud service or other server.
21. Driver closes and locks door: delivery app calls REST API (GET /api/accesses/{id}/lock).
22. Driver marks delivery as completed in delivery app: delivery app calls REST API (GET/api/accesses/{id}/remove).
23. Delivery confirmation receipt is sent to and appears in customer app, including link to video of the delivery.
24. Consumer app prompts user for feedback with a star system to rate their delivery experience.

In further example implementations, the completion of the delivery (i.e. step 22 above) may provide confirmation that money can be transferred to the supplier of the delivered goods or other payment. This may use various different steps. For example, in the case of an online purchase, the system 10 may hold on to the funds received from the end customer until delivery is confirmed (i.e. a type of escrow). When the delivery is completed, the supplier may be paid. Alternatively, when the electronically activated locking mechanism is provided and controlled by a third party, which is activated on behalf of a delivery company (see the example below described with reference to FIGS. 25 and 26) then the third party lock vendor may require a fee in order to grant access (either ongoing or for each lock or unlock event). When the delivery is completed then the system may pay such a fee (whether or not other funds are being held back and dependent of a delivery confirmation).

The following list describes functions used to implement various different steps in the method 100.

1. Checking if phone number is user that can access the delivery server from online shop.
2. After paying within an online shop, create order and ask the user to accept delivery (no time specified).
3. Online shop has booked a delivery with a delivery company.
4. Delivery company looks up tracking id.
5. Online shop has booked a delivery with a delivery company, create delivery from order id.
6. Delivery company requests access to electronic locking system. Notification with access time sent to end user.
7. Delivery company pushes delivery schedule to server 60.
8. App gets delivery schedule.

The electronically activated locking mechanism may be provided by Glue AB, Stockholm Sweden. Example locks may be found https://www.gluehome.com/products (retrieved 14 Mar. 2017) and also described in detail within WO/2017/046399. Such mechanisms may be integrated with door locks or retrofitted to existing locks and doors. These mechanisms may include one or more electronic motors that interface with a mechanical lock (e.g. a Eurocylinder lock) and include a wireless communication module (e.g. BLE, WiFi, or cellular networks, including GSM, UMTS and LTE) that receives (and may transmit) signals that control the one or more motors. Local or remote servers may issue the commands received by the wireless communication module (e.g. over the internet, perhaps using a wireless bridge or hub, for example.

Figure 25:
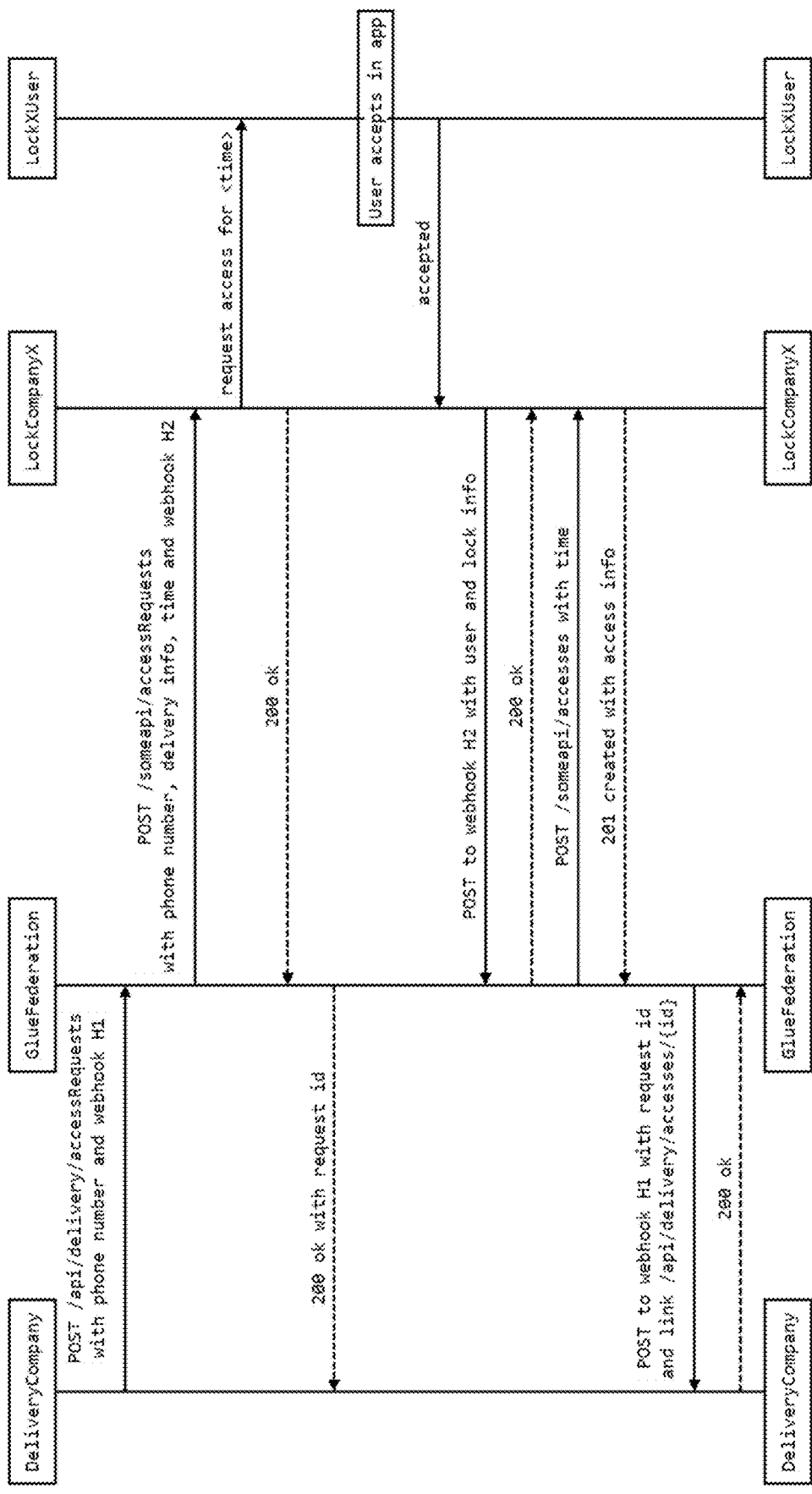
FIG. 25 shows a sequence diagram of a portion of a further example method used to provide access to the electronically activated locking mechanism.
Figure 26:
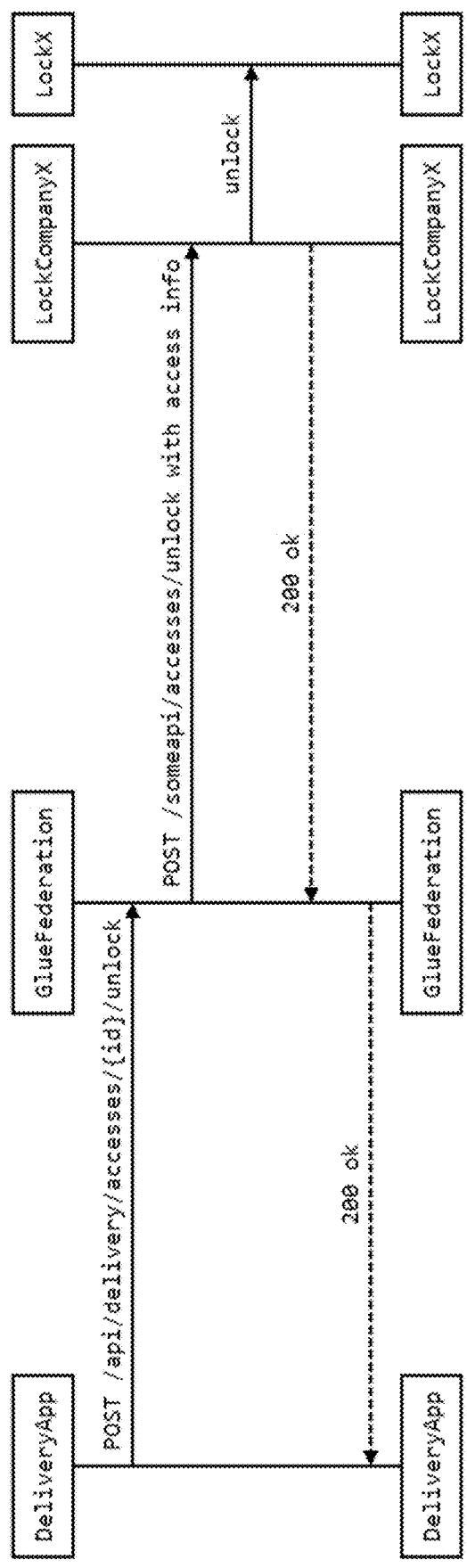
FIG. 26 shows a sequence diagram of a portion of a further example method for providing access to a location secured by an electronically activated locking mechanism.

Delivery companies can be granted access to digital locks from different suppliers through an API or other interface. FIGS. 25 and 26 illustrate the operation of such procedures using this API.

FIG. 25 illustrates a sequence diagram of a procedure that may, in some examples, operate together with the steps shown in FIG. 26 (described below) that provides access to a particular third party electronically activated locking mechanism and systems that control it. This may or may not involve the payment of fees to the third party vendor (LockCompanyX in this example). Security auditing of such access events may take place (e.g. to record who had access to a particular location and when) or for other purposes, including fees and payments (i.e. the third party may receive payment to provide authorised access or unlocking commands, as described above).

When an order is placed (either at the same time or afterwards) a delivery company (either the entity that supplies the delivered goods or another party) can make a request to be able to operate the third party lock belonging to a lock user or owner (LockXUser) according to the procedure described with reference to FIG. 26. An API (GlueFederation) may act as a conduit between systems and organisations in this procedure.

The delivery company (DeliveryCompany) issues a request to the API (GlueFederation) that includes one or more identifiers of the owner of the lock (LockXUser), together with a delivery time window indicator (e.g. time/date or range of times). The API (GlueFederation) acts as an interface for this request, which is passed on to LockCompanyX. In this example, the request (or a request for confirmation or acceptance) is passed on to the user of the lock (LockXUser), which ideally should be the same person or entity that requested the deliver or will take possession of the delivered goods.

The user (LockXUser) may accept (or reject) the request (e.g. using a separate mobile application or other mechanism). This acceptance is passed back to LockCompanyX, which provides further confirmation and any other data necessary to be able to operate the lock (LockX) at the designated time or within the time window. This further confirmation passes through the API (GlueFederation) and back to the DeliveryCompany. Therefore, temporary (or in some examples, permanent) access may be provided using a third party electronically activated locking mechanism (or a locking system provided and operated by any of the parties).

FIG. 25 illustrates a sequence diagram showing the steps required to unlock an electronic locking mechanism (LockX) that operates using signals originating from a third party (LockCompanyX) or from any of the other parties. The DeliveryApp is the mobile app running on the mobile device 20 and GlueFederation is the entity that provides or processes the API.

When an unlocking command is generated, i.e. provided that the mobile device 20 is close to or at the location and any further conditions are met allowing the user of the mobile device 20 to manually send the unlocking command (or sending it automatically) then this is sent to the API (GlueFederation). As shown in FIG. 26, the API interacts with the third party operator (LockCompanyX) of the lock (LockX), which may be using an API of LockCompanyX of another interface. This causes the lock (LockX) to receive an unlocking command in the format this it expects (e.g. directly or through a wireless bridge or other interface). Acknowledgements or other communications (e.g. security confirmations) may also be sent between LockX and LockCompanyX but these are not shown in this Figure.

LockCompanyX responds to the API (GlueFederation) with an acknowledgement, if successful, and the API responds with a further success acknowledgement back to the mobile app (DeliveryApp) operating on the mobile device 20. Therefore, the user of the mobile device 20 will preferably, not see any difference in operation or functionality whatever the make, configuration or operating entity of the electronic locking mechanism that they are interacting with.

As will be appreciated by the skilled person, details of the above embodiment may be varied without departing from the scope of the present invention, as defined by the appended claims.

For example, the system is not limited to delivery of goods but may be extended to other scenarios where a property can be unlocked without the presence of the owner or occupier (e.g. providing access to visiting guests, cleaning service, dog walker, etc. before the owner returns home). The signal causing unlocking may take different forms. For example, the electronically activated locking mechanism may be connected to a network (e.g. within the property) and receive a signal or code or PIN over that network.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The invention claimed is:

1. A method for providing access to a location secured by an electronically activated locking mechanism, the method comprising the steps of:
   detecting a geographical position of a mobile device;
   determining that the detected geographical position of the mobile device is proximate to the location secured by the electronically activated locking mechanism;
   transmitting a signal causing the electronically activated locking mechanism to unlock;
   initiating a recording from a camera of a local device in response to determining that the mobile device is proximate to the location secured by the electronically activated locking mechanism;
   transmitting a further signal from the mobile device causing the electronically activated locking mechanism to lock; and
   automatically stopping the recording from the camera of the local device in response to determining that the mobile device is no longer proximate to the location secured by the electronically activated locking mechanism.

2. The method of claim 1, wherein the geographical position of the mobile device is determined by: GPS, base station triangulation, RFID, Bluetooth Low Energy proximity detection, or WiFi.

3. The method of claim 1, wherein the signal is transmitted from the mobile device, and wherein the transmitted signal is transmitted from the mobile device by: Bluetooth, Bluetooth Low Energy, WiFi, GSM, LTE, UMTS, and cellular communications.

4. The method according to claim 1, wherein determining that the geographical position of the mobile device is proximate to the location secured by the electronically activated locking mechanism further comprises determining that the geographical position is within a predetermined distance from the secured location.

5. The method according to claim 1, wherein transmitting the signal causing the electronically activated locking mechanism to unlock further comprises the steps of transmitting a signal from the mobile device to a server and in response, transmitting a signal from the server to the electronically activated locking mechanism.

6. The method according to claim 1, wherein the signal causing the electronically activated locking mechanism to unlock is transmitted in response to the determination that the determined geographical position of the mobile device is proximate to the location secured by the electronically activated locking mechanism.

7. The method according to claim 1 further comprising a step of receiving a command from a user to unlock the locking mechanism and transmitting a signal causing the electronically activated locking mechanism to unlock when it is determined that the geographical position of the mobile device is proximate to the location secured by the electronically activated locking mechanism.

8. The method according to claim 1, wherein the recording is stored within a remote server.

9. The method according to claim 1 further comprising a step of sending a notification indicating that the mobile device is proximate to the location secured by the electronically activated locking mechanism, wherein the notification is received by a further mobile device.

10. The method according to claim 1, wherein the step of transmitting a further signal causing the electronically activated locking mechanism to lock is transmitted after determining that the mobile device is no longer proximate to the location secured by the electronically activated locking mechanism.

11. The method of claim 10, wherein determining that the mobile device is no longer proximate to the location secured by the electronically activated locking mechanism further comprises determining that the geographical position of the mobile device is greater than a further predetermined distance from the secured location.

12. The method according to claim 1 further comprising causing a notification to be sent indicating that the electronically activated locking mechanism has been locked.

13. The method according to claim 1, wherein the signal causing the electronically activated locking mechanism to unlock enables the mobile device to issue a command to unlock the electronically activated locking mechanism.

14. The method according to claim 1, wherein the signal causing the electronically activated locking mechanism to unlock is protected by encryption.

15. The method according to claim 1 further comprising a step of:
before transmitting the signal causing the electronically activated locking mechanism to unlock issuing a request for access to the electronically activated locking mechanism.

16. The method of claim 15, wherein the access is granted for a limited period of time.

17. The method of claim 15, wherein the request and any response are issued using an application programming interface, API.

18. A system for providing access to a location comprising:
an electronically activated locking mechanism;
a processor; and
memory storing computer-executable instructions that, when executed by the processor, cause a computer to:
receive a signal indicating that a mobile device is proximate to a location secured by the electronically activated locking mechanism and in response, transmitting a signal causing the electronically activated locking mechanism to unlock;
initiate a recording from a camera of a local device in response to determining that the mobile device is proximate to the location secured by the electronically activated locking mechanism;
transmit a further signal from the mobile device causing the electronically activated locking mechanism to lock; and
automatically stop the recording from the camera of the local device in response to determining that the mobile device is no longer proximate to the location secured by the electronically activated locking mechanism.

19. The system of claim 18, further comprising a server containing the memory storing the computer-executable instructions.

20. A non-transitory storage medium storing machine-executable instructions that, when executed, cause a computing device to provide access to a location secured by an electronically activated locking mechanism by:
detecting a geographical position of a mobile device;
determining that the detected geographical position of the mobile device is proximate to the location secured by the electronically activated locking mechanism;
transmitting a signal causing the electronically activated locking mechanism to unlock;
initiating a recording from a camera of a local device in response to determining that the mobile device is proximate to the location secured by the electronically activated locking mechanism;
transmitting a further signal from the mobile device causing the electronically activated locking mechanism to lock; and
automatically stopping the recording from the camera of the local device in response to determining that the mobile device is no longer proximate to the location secured by the electronically activated locking mechanism.

* * * * *